(12) United States Patent  (10) Patent No.: US 8,947,218 B2
Yoshizawa et al.  (45) Date of Patent: Feb. 3, 2015

(54) DRIVING SUPPORT DEVICE

(75) Inventors: Shintaro Yoshizawa, Gotemba (JP); Hirotaka Kaji, Hadano (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 35 days.

(21) Appl. No.: 13/504,373

(22) PCT Filed: Mar. 23, 2010

(86) PCT No.: PCT/JP2010/054990
§ 371 (c)(1),
(2), (4) Date: Apr. 26, 2012

(87) PCT Pub. No.: WO2011/052247
PCT Pub. Date: May 5, 2011

(65) Prior Publication Data
US 2012/0218093 A1  Aug. 30, 2012

(30) Foreign Application Priority Data
Oct. 30, 2009 (JP) .................. 2009-250976

(51) Int. Cl.
*B60Q 1/00* (2006.01)
*G08G 1/16* (2006.01)
(Continued)

(52) U.S. Cl.
CPC *G08G 1/163* (2013.01); *B60R 1/00* (2013.01); *B60R 21/0134* (2013.01); *B60W 30/08* (2013.01); *B60W 30/095* (2013.01); *G08G 1/166* (2013.01); *B60R 2300/302* (2013.01); *B60R 2300/307* (2013.01); *B60W 40/04* (2013.01); *B60W 50/16* (2013.01); *B60W 2050/143* (2013.01); *B60W 2050/146* (2013.01); *B60W 2520/10* (2013.01); *B60W 2540/20* (2013.01);
(Continued)

(58) Field of Classification Search
USPC .......................... 340/436, 903; 701/96, 301
See application file for complete search history.

(56) References Cited

U.S. PATENT DOCUMENTS 5,572,428 A  11/1996 Ishida et al.
6,487,500 B2 * 11/2002 Lemelson et al. ............ 701/301
(Continued)

FOREIGN PATENT DOCUMENTS

CN  101395648 A  3/2009
EP  1956574 A2  8/2008
(Continued)

OTHER PUBLICATIONS

International Search Report mailed Jun. 29, 2010 of PCT/JP2010/054990.

(Continued)

*Primary Examiner* — Daniel Wu
*Assistant Examiner* — Israel Daramola
(74) *Attorney, Agent, or Firm* — Kenyon & Kenyon LLP

(57) ABSTRACT

An ECU of a driving support device predicts the risk of contact between a host vehicle and obstacles around the host vehicle when the host vehicle travels by a driving action related to at least one normative action candidate, which is a normative driving action candidate of the host vehicle for the surrounding conditions of the host vehicle. Therefore, it is possible to provide the normative action candidates considering the risk of contact between the host vehicle and the obstacles around the host vehicle.

7 Claims, 32 Drawing Sheets

(51) Int. Cl.
*B60R 1/00* (2006.01)
*B60R 21/0134* (2006.01)
*B60W 30/08* (2012.01)
*B60W 30/095* (2012.01)
*B60W 40/04* (2006.01)
*B60W 50/16* (2012.01)
*B60W 50/14* (2012.01)

(52) U.S. Cl.
CPC ........ *B60W 2550/10* (2013.01); *B60W 2550/14* (2013.01); *B60W 2550/141* (2013.01); *B60W 2550/142* (2013.01); *B60W 2550/146* (2013.01); *B60W 2550/22* (2013.01); *B60W 2550/406* (2013.01); *B60W 2550/408* (2013.01); *B60Y 2300/18158* (2013.01)
USPC ............. 340/435; 340/436; 340/903; 701/96; 701/301

(56) References Cited

U.S. PATENT DOCUMENTS

| | | | |
|---|---|---|---|
| 7,844,384 B2 * | 11/2010 | Seto | 701/96 |
| 2007/0080825 A1 * | 4/2007 | Shiller | 340/903 |
| 2009/0012703 A1 | 1/2009 | Aso et al. | |
| 2010/0007480 A1 * | 1/2010 | Uozumi et al. | 340/436 |
| 2010/0121576 A1 * | 5/2010 | Aso et al. | 701/301 |

FOREIGN PATENT DOCUMENTS

| | | |
|---|---|---|
| JP | H07104062 A | 4/1995 |
| JP | 2005-122260 A | 5/2005 |
| JP | 2005-202512 A | 7/2005 |
| JP | 2006-154967 A | 6/2006 |
| JP | 2007-164339 A | 6/2007 |
| JP | 2008-191781 A | 8/2008 |
| JP | 2008-230467 A | 10/2008 |
| JP | 2009-003650 A | 1/2009 |
| JP | 2009-073465 A | 4/2009 |
| JP | 2009-098970 A | 5/2009 |
| WO | 2007/102405 A1 | 9/2007 |

OTHER PUBLICATIONS

A. Eidehall, "Tracking and threat assessment for automotive collision avoidance," Linkoping Studies in Science and Technology, Dissertations, No. 1066, 2007.

Jamstec, "Multiscale Simulation & Modeling Research Group" (with English translation); <http://www.jamstec.go.jp/esc/research/Mssg/models/model/AOGCM.ja.html> accessed Nov. 15, 2013.

H. Miura, "Fitness traffic analysis to round about introduction in consideration of traffic by pedestrian," (with English translation), Traffic Engineering Lab, year unknown.

V.I. Arnold, "Mathematical Methods of Classical Mechanics," Graduate Texts in Mathematics 60, Second Edition, Springer-Verlag, 1988.

Translation of International Preliminary Report on Patentability mailed Jun. 21, 2012 of PCT/JP2010/054990.

Broadhurst, A. et al., "A prediction and planning framework for road safety analysis, obstacle avoidance and driver information," Proceedings of the 11th World Congress on Intelligent Transportation Systems, Oct. 31, 2004, vol. 1, pp. 4716-4727.

* cited by examiner

DRIVING SUPPORT DEVICE

TECHNICAL FIELD

The present invention relates to a driving support device and more particularly, to a driving support device that performs driving support, which is the norm for driving the host vehicle.

BACKGROUND ART

A device has been proposed which provides information about a norm for driving the host vehicle on a route. For example, Patent Literature 1 discloses a device that determines the traveling environment of the vehicle and the state of the vehicle in a comprehensive manner and performs driving support most suitable for the driver of the vehicle. The device detects the traveling environment of the vehicle and the state of the vehicle. The device estimates the traveling state of the vehicle on the basis of the detected traveling environment and state of the vehicle. In addition, the ideal operating model of the vehicle corresponding to the traveling environment is calculated. Then, the presence/absence of a deviation of the estimated operation state from the ideal operating model is calculated. When a deviation occurs, an actuator is driven to perform the driving support of the vehicle. The device calculates the ideal driving model on the basis of traffic rules or morals.

CITATION LIST

Patent Literature

[Patent Literature 1] Japanese Unexamined Patent Application Publication No. 2005-202512

SUMMARY OF INVENTION

Technical Problem

However, in any normative model, the risk of contact is likely to exist between the host vehicle and obstacles around the host vehicle. Therefore, it is preferable to perform driving support considering the risk, in order to improve safety.

The invention has been made in view of the above-mentioned problems and an object of the invention is to provide a driving support device that performs driving support as a norm for driving the host vehicle considering the risk of contact between the host vehicle and obstacles around the host vehicle.

Solution to Problem

According to an aspect of the invention, there is provided a driving support device including a risk prediction unit that predicts a risk of contact between a host vehicle and an obstacle around the host vehicle when the host vehicle travels by a driving action related to at least one normative action candidate, which is a normative driving action candidate of the host vehicle for surrounding conditions of the host vehicle.

According to this structure, the risk prediction unit predicts the risk of contact between the host vehicle and obstacles around the host vehicle when the host vehicle travels by the driving action related to at least one normative action candidate, which is a normative driving action candidate of the host vehicle for the surrounding conditions of the host vehicle. Therefore, it is possible to provide the normative action candidates considering the risk of contact between the host vehicle and obstacles around the host vehicle.

According to another aspect of the invention, there is provided a driving support device including: a risk prediction unit that predicts a risk of contact between a host vehicle and obstacles around the host vehicle when the host vehicle travels by a driving action related to at least one normative action candidate, which is a normative driving action candidate of the host vehicle for surrounding conditions of the host vehicle; and a movement efficiency acquiring unit that acquires movement efficiency when the host vehicle travels by the driving action related to the normative action candidate.

According to this structure, the risk prediction unit predicts the risk of contact between the host vehicle and obstacles around the host vehicle when the host vehicle travels by the driving action related to at least one normative action candidate, which is a normative driving action candidate of the host vehicle for the surrounding conditions of the host vehicle, and the movement efficiency acquiring unit acquires the movement efficiency when the host vehicle travels by the driving action related to the normative action candidate. Therefore, it is possible to provide the normative action candidates considering the risk of contact between the host vehicle and obstacles around the host vehicle, and the movement efficiency.

In this case, the risk prediction unit may recognize obstacles on the basis of obstacle information acquired from obstacles around the host vehicle and information acquired from a database in which any one of information which is more macroscopically associated with the obstacle information and information which is more microscopically associated with the obstacle information is hierarchically stored, and predict the risk of contact between obstacles and the host vehicle.

According to this structure, the risk prediction unit recognizes obstacles on the basis of obstacle information acquired from obstacles around the host vehicle and the information acquired from the database in which any one of information which is more macroscopically associated with obstacle information and the information which is more microscopically associated with the obstacle information is hierarchically stored, and predicts the risk of contact between obstacles and the host vehicle. Therefore, even when obstacle information acquired from obstacles is limited, it is possible to obtain macroscopic or microscopic information from the range of the obtained information and thus accurately recognize obstacles.

The risk prediction unit may predict the risk of contact between the obstacle and the host vehicle while predicting a normal path, which is the most general path, and an irregular path different from the normal path for paths of the host vehicle or the obstacle in which the predicted destinations are the same.

According to this structure, the risk prediction unit predicts the risk of contact between the obstacle and the host vehicle while predicting the normal path, which is the most general path, and the irregular path different from the normal path for paths of the host vehicle or the obstacle in which the predicted destinations are the same. Therefore, it is possible to improve of the accuracy of predicting the risk considering a plurality of paths.

In this case, the risk prediction unit may predict the risk of contact between the obstacle and the host vehicle while predicting an overt path, which is a directly recognizable path of the obstacle, and a latent path, which is a path of the obstacle that cannot be directly recognized, but is expected to exist, for the predicted path of the obstacle.

According to this structure, the risk prediction unit predicts the risk of contact between the obstacle and the host vehicle while predicting the overt path, which is a directly recognizable path of the obstacle, and the latent path, which is a path of the obstacle that cannot be directly recognized, but is expected to exist, for the predicted path of the obstacle. Therefore, it is also possible to predict the risk of a latent obstacle and improve the reliability of the predicted risk.

The risk prediction unit may predict the risk of contact between the obstacle and the host vehicle on the basis of a distribution of the probability of the host vehicle and the obstacle existing on the predicted path of the host vehicle and the obstacle.

According to this structure, the risk prediction unit predicts the risk of contact between the obstacle and the host vehicle on the basis of the distribution of the probability of the host vehicle and the obstacle existing on the predicted path of the host vehicle and the obstacle. Therefore, it is possible to predict the risk of contact between the host vehicle and the obstacle with a small amount of calculation, as compared to, for example, a method of calculating the probability of the host vehicle and the obstacle existing on the entire road.

In this case, the risk prediction unit may predict the risk of contact between the host vehicle and the obstacle on the basis of a distribution of the probability of the host vehicle and the obstacle existing in a space having the position and speed of the host vehicle and the obstacle on the predicted path as coordinate axes.

According to this structure, the risk prediction unit predicts the risk of contact between the host vehicle and the obstacle on the basis of the distribution of the probability of the host vehicle and the obstacle existing in the space having the position and speed of the host vehicle and the obstacle on the predicted path as coordinate axes. Therefore, it is possible to predict the risk of contact between the host vehicle and the obstacle with a small amount of calculation.

The risk prediction unit may predict a short-term risk, which is the risk of contact between the obstacle and the host vehicle after a predetermined time has elapsed from the current time, and a long-term risk, which is the risk of contact between the obstacle and the host vehicle after a time longer than the predetermined time has elapsed, when the host vehicle travels by the driving action related to the normative action candidate.

According to this structure, the risk prediction unit predicts the short-term risk, which is the risk of contact between the obstacle and the host vehicle after the predetermined time has elapsed from the current time, and the long-term risk, which is the risk of contact between the obstacle and the host vehicle after the time longer than the predetermined time has elapsed, when the host vehicle travels by the driving action related to the normative action candidate. Therefore, it is possible to predict the risk of contact between the obstacle and the host vehicle in various ways from a short-term point of view and a long-term point of view for the normative action candidate.

If the short-term risk is more than a predetermined threshold value, the risk prediction unit may stop the prediction of the long-term risk when the host vehicle travels by the driving action related to the normative action candidate.

According to this structure, when the short-term risk is more than the predetermined threshold value and the risk of the driving action related to the normative action candidate is very high in the short time, the risk prediction unit stops the prediction of the long-term risk since the validity of the normative action candidate is low and the necessity for predicting the long-term risk later is low. Therefore, it is possible to reduce the amount of unnecessary calculation.

Advantageous Effects of Invention

According to the driving support device of the invention, it is possible to provide the normative action candidates considering the risk of contact between the host vehicle and the obstacles around the host vehicle.

DESCRIPTION OF EMBODIMENTS

Figure 1:
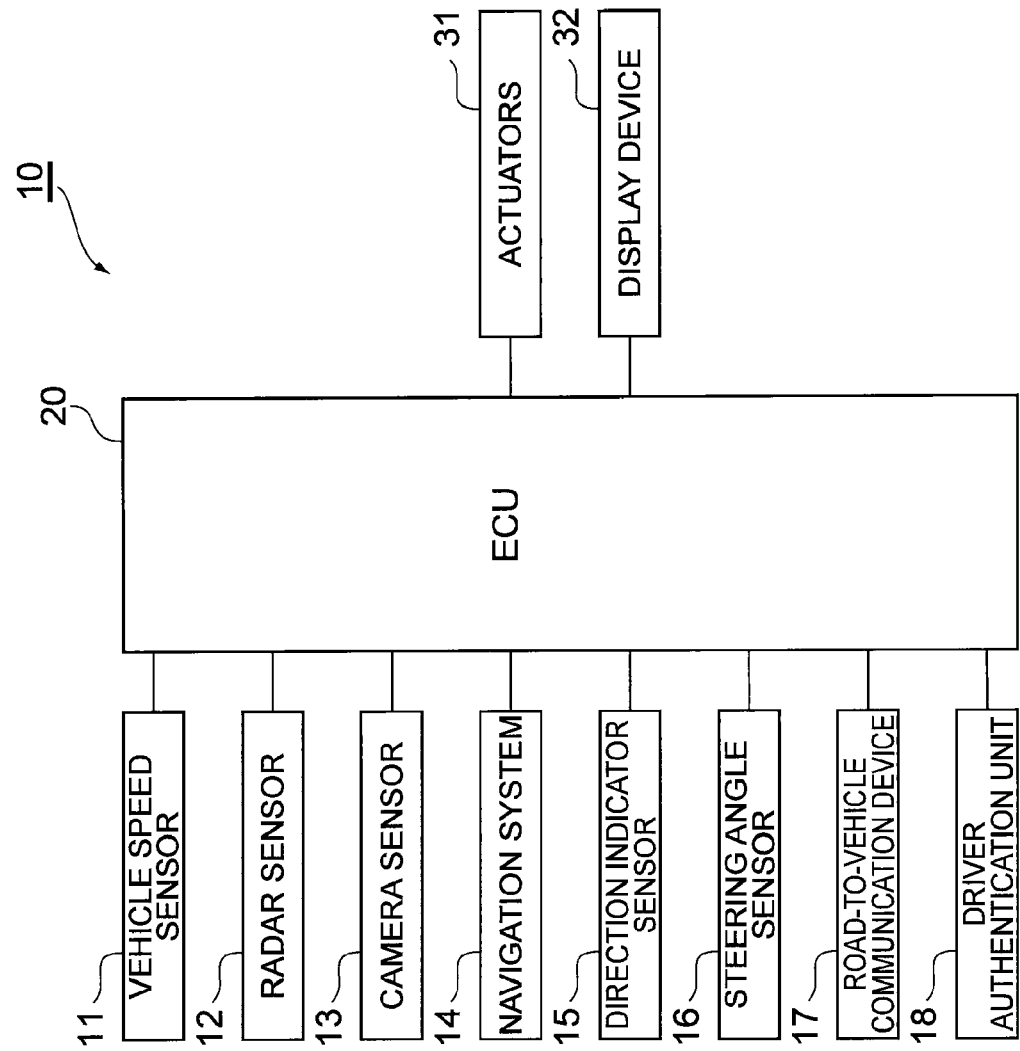
FIG. 1 is a block diagram illustrating the structure of a driving support device according to an embodiment.

Hereinafter, a driving support device according to an exemplary embodiment of the invention will be described with reference to the accompanying drawings. The driving support device according to this embodiment is provided in a vehicle and provides a normative action which is the norm for driving the vehicle along a route with a low risk and high movement efficiency to the driver of the host vehicle. As shown in FIG. 1, a driving support device 10 according to this embodiment includes a vehicle speed sensor 11, a radar sensor 12, a camera sensor 13, a navigation system 14, a direction indicator sensor 15, a steering angle sensor 16, a road-to-vehicle communication device 17, a driver authentication unit 18, an ECU 20, actuators 31, and a display device 32.

The vehicle speed sensor 11 is for detecting the speed of the host vehicle from the rotational speed of the axle of the host vehicle.

The radar sensor 12 emits, for example, millimeter waves to the front side of the host vehicle to recognize obstacles, such as other vehicles, motorcycles, bicycles, and pedestrians in front of the host vehicle. In addition, the radar sensor 12 recognizes obstacles fixed on the road and the shape of the road, such as the alignment, curvature radius, and gradient of the road.

The camera sensor 13 captures the image of the front side of the host vehicle and recognizes obstacles, such as other vehicles, motorcycles, bicycles, and pedestrians in front of the host vehicle, using, for example, pattern recognition. In addition, the camera sensor 13 recognizes obstacles fixed on the road and the shape of the road, such as the alignment, curvature radius, and gradient of the road, using, for example, pattern recognition.

The navigation system 14 acquires information about the shape of the road on which the host vehicle travels, such as the alignment, curvature radius, and gradient of the road, on the basis of the position of the host vehicle measured by a GPS (Global Positioning System) and map information stored in a database. The navigation system 14 is also used to estimate the route of the host vehicle from information about the destination or route input by the driver.

The direction indicator sensor 15 is for detecting the direction indicated by a direction indicator (blinker) of the host vehicle. The direction indicator sensor 15 is used to estimate the route of the host vehicle. The steering angle sensor 16 is for detecting the steering angle of the host vehicle. The steering angle sensor 16 is used to estimate the route of the host vehicle.

The road-to-vehicle communication device 17 is for acquiring information about the shape of the road in front of the host vehicle, such as the alignment, curvature radius, and gradient of the road, from a road infrastructure, such as an optical beacon transmitter. In addition, the road-to-vehicle communication device 17 is for receiving information about obstacles, such as other vehicles and pedestrians detected by road-side sensors. The road-to-vehicle communication device 17 is used to acquire information about the state of the road on which the host vehicle travels, such as the amount of traffic, congestion, accidents, and traffic regulations of the road.

The driver authentication unit 18 is for authenticating the driver of the host vehicle. The driver authentication unit 18 authenticates the driver, for example, by detecting the input of an identification number by the driver or the insertion of an ID card, or by using a biometric authentication technique for identifying the fingerprint, retina, iris or similar of the driver.

The ECU (Electronic Control Unit) 20 predicts the risk of contact between the host vehicle and obstacles around the host vehicle and movement efficiency when the host vehicle travels by a driving action related to some normative action candidates, which are normative driving action candidates of the host vehicle in the surrounding conditions of the host vehicle, on the basis of the information obtained from, for example, the vehicle speed sensor 11.

The actuators 31 include a brake actuator and an accelerator actuator which intervene in the driving operation of the driver on the basis of the normative action candidates calculated by the ECU 20 or the normative action selected from the normative action candidates and drive the brake and the accelerator of the host vehicle. In addition, the actuators 31 may give reaction force to, for example, the accelerator operation of the driver.

The display device 32 is a display which displays images to the driver, a speaker that outputs a voice for guiding the driver, or a buzzer that gives an alarm to the driver. The display device 32 is for presenting information based on the normative action candidates calculated by the ECU 20 to the driver.

Figure 2:
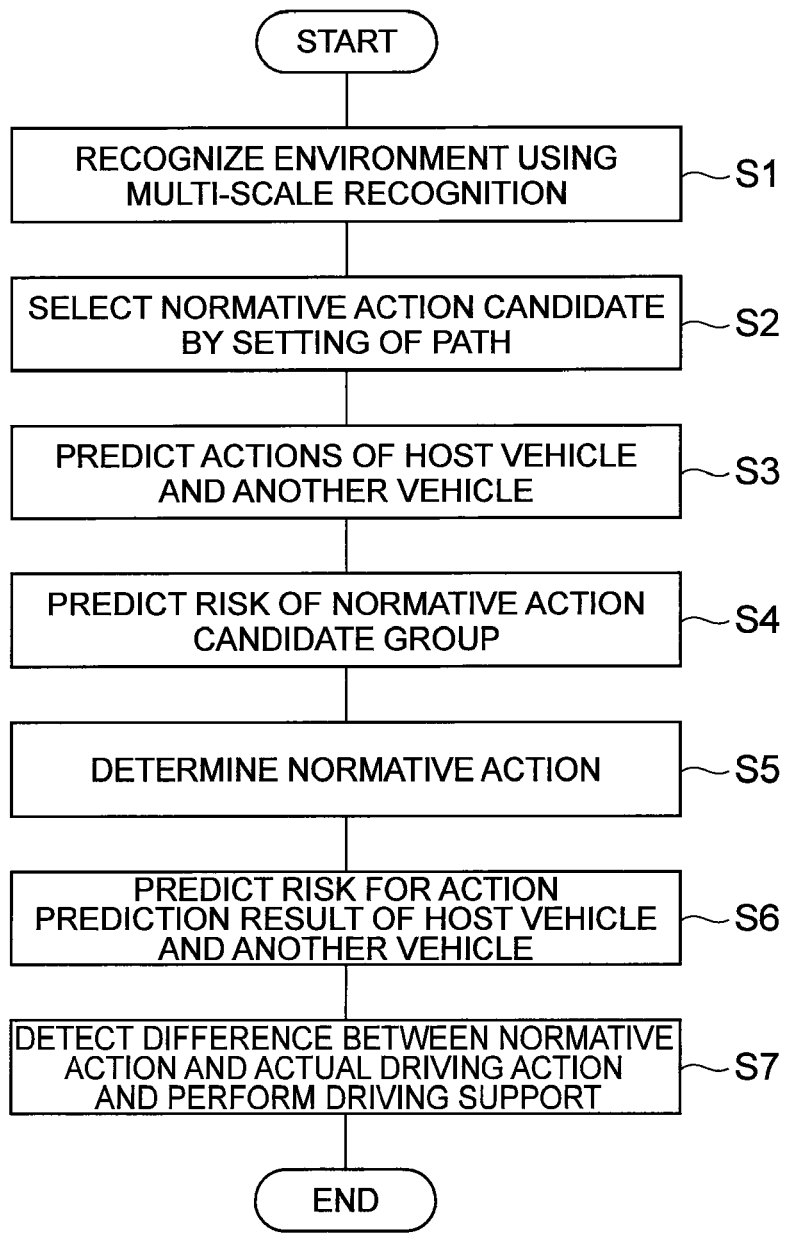
FIG. 2 is a flowchart illustrating the outline of the operation of the driving support device according to the embodiment.

Next, the operation of the driving support device 10 according to this embodiment will be described. First, the outline of the operation of the driving support device 10 will be described. As shown in FIG. 2, the driving support device 10 according to this embodiment recognizes the environment of obstacles, such as other vehicles around the host vehicle, using multi-scale recognition (S1). The multi-scale recognition hierarchically classifies viewpoint categories for avoiding accidents from a microscopic category to a macroscopic category in accident pattern analysis, and recognizes and selects an obstacle, which will be a risk prediction target, from the category suitable for the present situation of the host vehicle.

The driving support device 10 selects the normative action candidate by path setting (S2). The path (route) of the host vehicle and the paths of other vehicles are set as follows. A plurality of paths are assumed in advance and weights are given to the allocation of the paths to movable bodies, such as other vehicles. The multi-scale recognition is performed for each observation result for a short period, such as 0.5 seconds, to update the weight of the allocation. In this stage, it is not necessary to narrow down the range of the paths to one path. The following two paths are set: an overt path which is the path of a directly recognizable obstacle; and a latent path, which is the path of an obstacle which cannot be directly recognized, but is expected to exist.

The driving support device 10 predicts the actions of the host vehicle and obstacles, such as other vehicles (S3). In the action prediction, the driving support device 10 estimates the probability distribution of the host vehicle and other vehicles existing in an (x, v) space having a position x on the path and a speed v as coordinates from the information obtained from, for example, the sensor and changes the probability distribution at a predetermined time interval, thereby predicting the future positions of the host vehicle and other vehicles.

The driving support device 10 predicts the risk of a normative action candidate group (S4). In the risk prediction, the driving support device 10 calculates a cross point (intersection) between the path of the host vehicle and an obstacle, such as another vehicle, and calculates the risk of contact at the cross point. In this case, the driving support device 10 also calculates the latent risk of contact with a movable body which is likely to latently exist in a blind spot. The driving support device 10 predicts the short-term risk and the long-term risk of the normative action candidate group and calculates the risks.

The driving support device 10 selectively determines the normative action with the minimum risk and the maximum movement efficiency from the normative action candidates (S5). In this case, the normative action is determined according to the tendency of the driving action of the individual driver.

The driving support device 10 calculates the risk for the actual action prediction result of movable bodies, such as the host vehicle and other vehicles (S6). When there is a large deviation between the actual path of the host vehicle and other vehicles and the predicted path, the driving support device 10 generates a path in real time using an extrapolation method and calculates the risks of the host vehicle and other vehicles at the cross points.

The driving support device 10 detects the difference between the normative action and the actual driving action and performs driving support using the actuators 31 or the display device 32 (S7).

Figure 3:
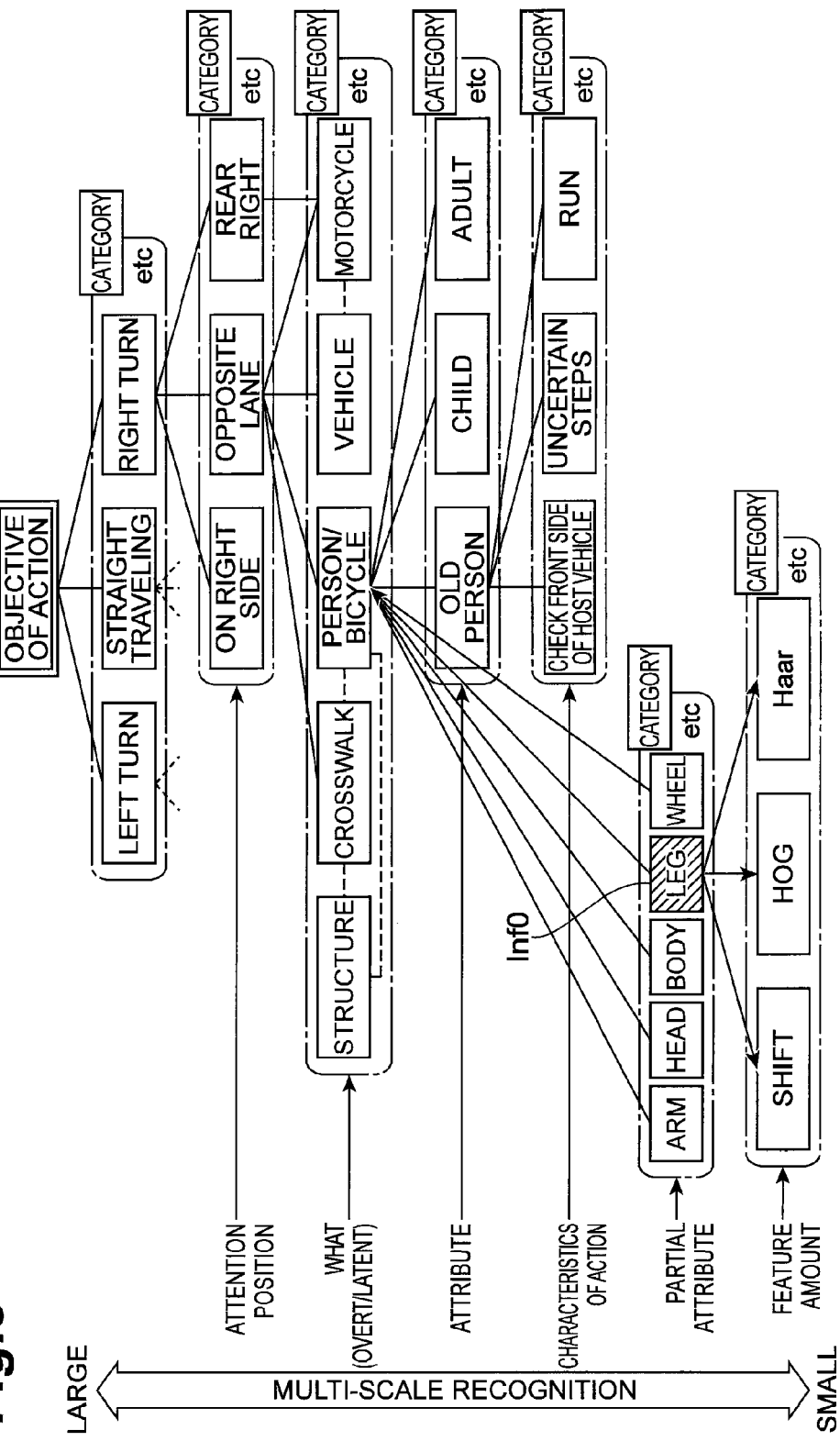
FIG. 3 is a diagram illustrating the concept of multi-scale recognition.

Next, an important process will be described in detail. First, the multi-scale recognition (S1) will be described. As shown in FIG. 3, knowledge is stored in the database inside the ECU 20 or outside the host vehicle, considering the magnitude of concept for preventing a typical accident in a situation in which the vehicle enters, for example, a four-way intersection.

For example, it is assumed that a "leg" is recognizable as information Inf0, among information items about the objects detected by the road-side sensor which are received by the radar sensor 12, the camera sensor 13, or the road-to-vehicle communication device 17. In this case, the ECU 20 of the driving support device 10 can extract, from the database shown in FIG. 3, information about feature amounts, such as "SHIFT", "HOG", and "Haar", in terms of a microscopic viewpoint. In addition, the ECU 20 of the driving support device 10 can extract, from the database shown in FIG. 3, information indicating whether an object is a "person or a bicycle" in terms of a macroscopic viewpoint. The ECU 20 may extract information in other layers.

In this embodiment, a multi-scale network structure is used to detect objects causing typical accidents without any omission, which makes it possible to improve the accuracy of risk prediction. In addition, the multi-scale recognition results obtained from a three-way intersection, a single road, and other traffic conditions are combined with each other to obtain knowledge for preventing accidents in a comprehensive way. As described above, in the multi-scale recognition, it is possible to perform useful recognition within the range of information which can be acquired.

Figure 4:
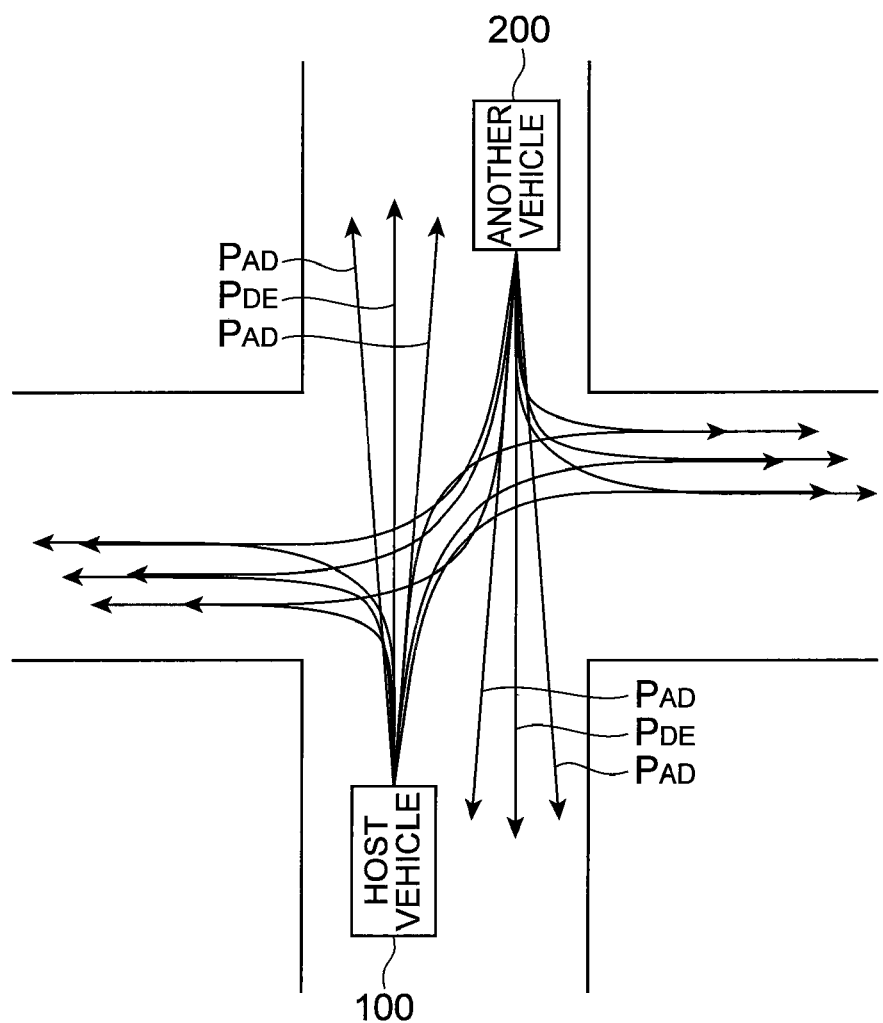
FIG. 4 is a plan view illustrating a default path and an adaptive path in the setting of the paths.

Next, the path setting (S2) will be described. It is assumed that information about the shape of the road can be acquired by the radar sensor 12, the camera sensor 13, the navigation system 14, and the road-to-vehicle communication device 17. In the situation of the intersection shown in FIG. 4, the ECU 20 of the driving support device 10 assumes default paths $P_{DE}$ along which the host vehicle 100 and another vehicle 200 turn right and left and travel straight under ideal conditions that there is no obstacle on the roads. In addition, the ECU 20 of the driving support device 10 assumes an adaptive path PAD which is a variant of the path and is included in the default path $P_{DE}$. The ECU 20 partially (separately) prepares the paths, considering the kinematics of the vehicle, and connects the paths using an instantaneous process. In this embodiment, a plurality of paths are prepared to improve the accuracy of risk prediction for the host vehicle and other vehicles.

Figure 5:
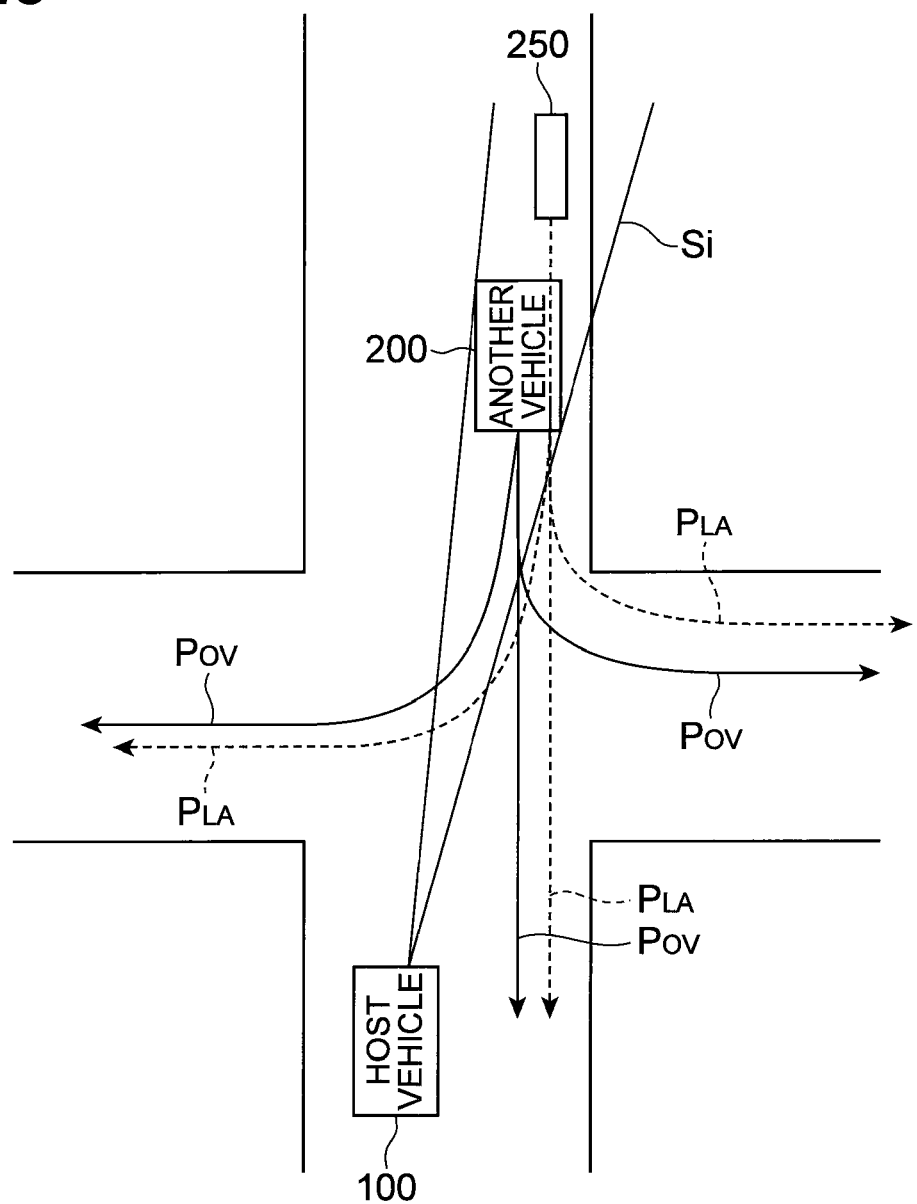
FIG. 5 is a plan view illustrating an overt path and a latent path in the setting of the paths.
Figure 6:
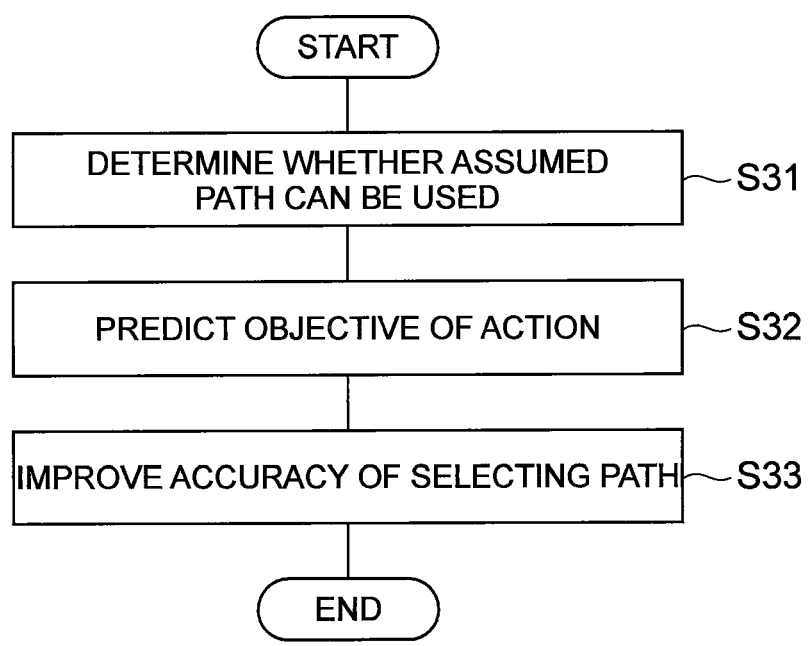
FIG. 6 is a flowchart illustrating the details of an operation of predicting the actions of the host vehicle and another vehicle.

In this embodiment, as shown in FIG. 5, the ECU 20 predicts an overt path $P_{OV}$ of another vehicle 200 which is directly recognizable in the field of view Si and a latent path $P_{LA}$ of a latent object 250, such as a motorcycle which is hidden by another vehicle 200 so as not to be directly recognizable, but is expected to exist. In this embodiment, since the latent path $P_{LA}$ is predicted, it is possible to predict the risk of a latent object which is assumed in the multi-scale recognition.

For the above-mentioned path setting, paths corresponding to the shape of the road or traffic conditions are stored in the database in advance and can be extracted according to the traveling conditions of the host vehicle. In addition, paths may be instantaneously derived according to the shape of the road or traffic conditions.

Next, a method of predicting the paths on which the host vehicle and another vehicle travel in stages as a precondition of action prediction will be described. The ECU 20 determines whether the assumed path can be used (S31). That is, the ECU 20 determines whether the host vehicle and another vehicle travel along the path which largely deviates from the assumed path. The ECU 20 observes the distance between the actual path of the host vehicle and another vehicle and the assumed path closest to the actual path in time series. When the period for which the distance between the assumed path and the actual path is equal to or more than a threshold value is equal to or more than a predetermined value in an observation time section, the ECU 20 determines that the assumed path cannot be used and generates a path according to the actual movement of the host vehicle and another vehicle using an extrapolation method.

Figure 7:
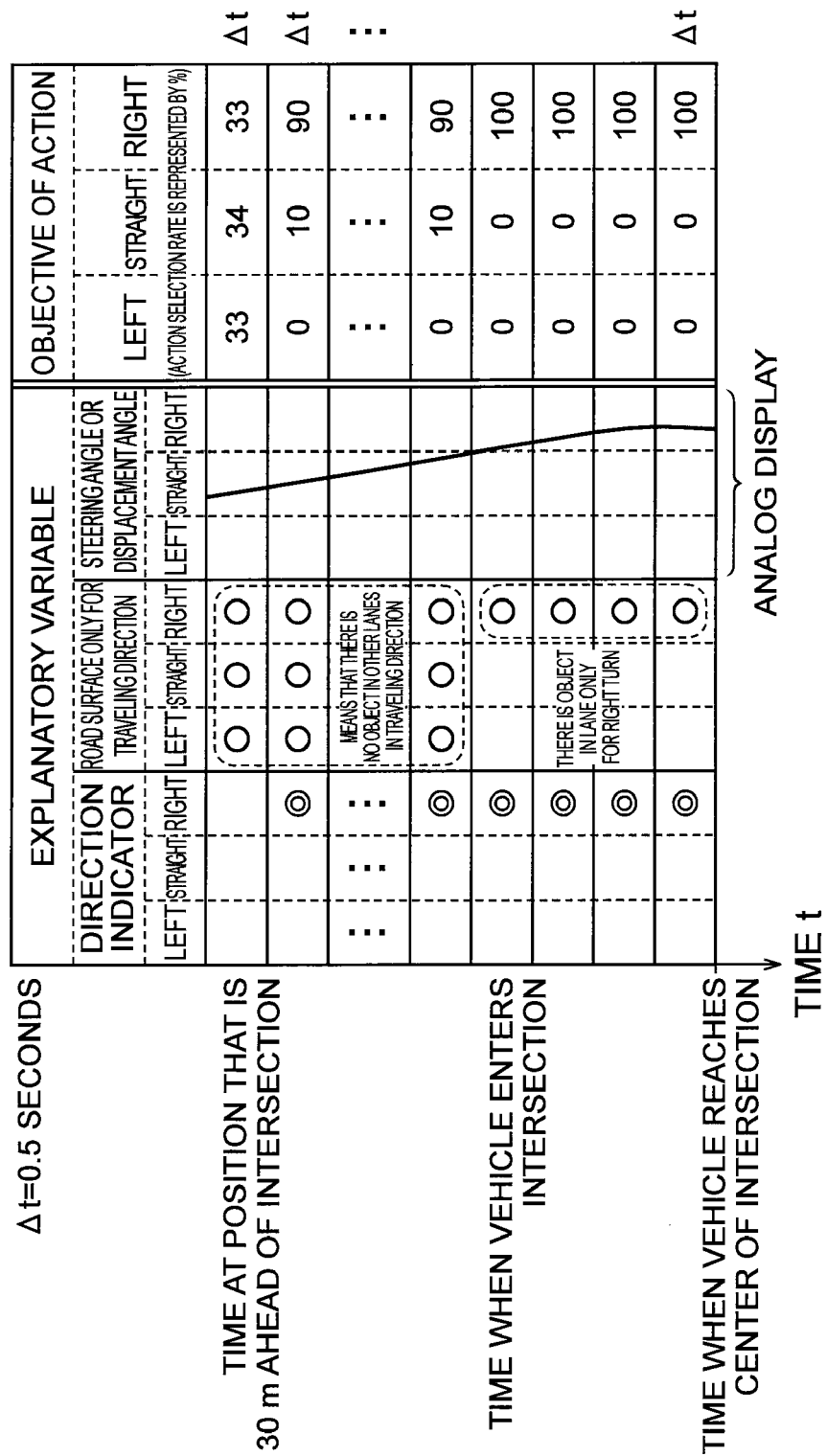
FIG. 7 is a table illustrating the relationship between an explanatory variable and an objective variable used in the prediction of the objective of the action.

Then, the ECU 20 predicts the objective of the action (S32). An explanatory variable indicating the conditions of the action of the host vehicle or another vehicle and an objective variable used to give a weight to the path are stored in the database, which is shown in FIG. 7, inside the ECU 20 or outside the host vehicle so as to be associated with each other. The ECU 20 determines the objective variable on condition that the explanatory variable is matched with the actual action of the host vehicle and another vehicle. However, the ECU 20 determines the analog value of a steering angle or a displacement angle using three discrete values indicating a right turn, a left turn, and straight traveling.

The ECU 20 improves the selection accuracy of the path on the basis of the prediction result of the objective of the action (S31). The ECU 20 determines the path to which the action of the host vehicle and another vehicle is allocated, using a plurality of prepared paths as the objective variables for each of the prediction results of the objective of the action, by, for example, a collective learning method, such as a bagging method, a boosting method, or a random forest method, or a kernel method.

Next, the action prediction (S3) and the risk prediction (S4) will be described. In this embodiment, as a basic point of view, an object moves on the assumed path and the existence of the object is modeled by a joint probability density function in a space having the position and speed of the object on the path as coordinate axes. An acceleration motion is assumed at each position and speed of the modeled probability density function, and the future position of the object on the path is predicted. Next, an example of the prediction will be described.

Figure 8:
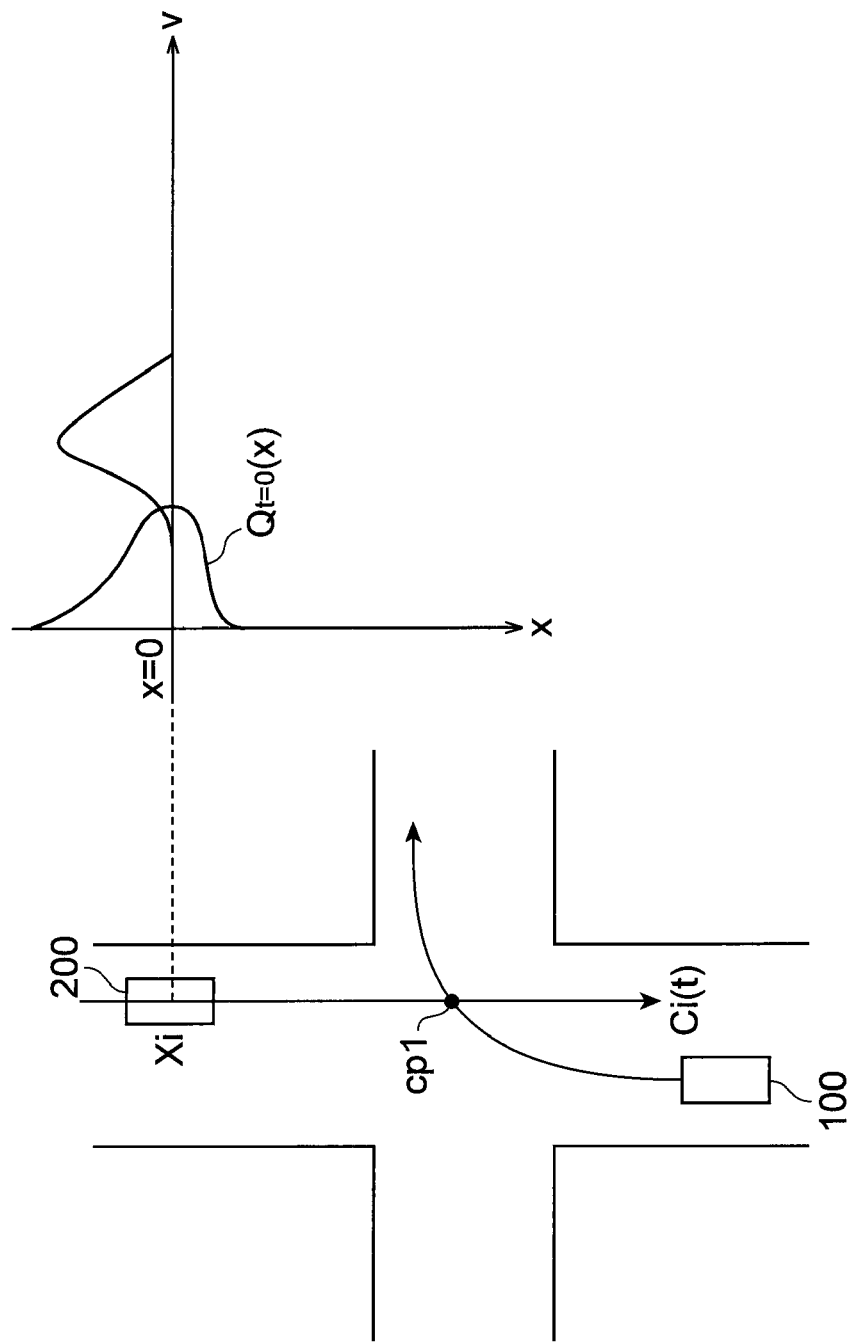
FIG. 8 is a diagram illustrating the distribution of the probability of an object existing in a space including a position and a speed as axes in the prediction of the action.

As shown in FIG. 8, it is assumed that objects $Xi(1)$ to $Xi(n)$ move on a path $Ci(t)$ (where n indicates the number of objects and t indicates time). It is assumed that a time parameter of the path $Ci$ is selected such that the graduations of the path are arranged at regular intervals. When the position of a given object $Xi(k)$ on the path $Ci(t)$ at a time $t=0$ is the origin (hereinafter, the suffix k is omitted), the position $xi$ of the object at the time t can be calculated by the following Expression 1.

$$xi = \int_0^t \|dCi/dt\| dt \qquad \text{[Expression 1]}$$

In the above-mentioned Expression 1, the norm is defined by measurement. It is assumed that the information of the object $Xi$ is distributed as a function $Pt(x, v)$ in the space having the position and speed of the object on the path $Ci(t)$ at the time t as axes. Since the information about the position and the speed includes various errors, it is represented by a distribution model, as shown in FIG. 8.

It is assumed that the object is moving with constant acceleration. When the coordinates are $(x_0, v_0)$ at the time $t=0$, the coordinates are $(x_0+v_0 \cdot t+\alpha \cdot t^2/2, v_0+\alpha \cdot t)$ at the time t (where $\alpha$ indicates acceleration (constant)). Therefore, the area is maintained in the coordinate conversion. The function obtained by performing fiber integration on the function $Pt(x, v)$ related to the coordinate v is defined as $Qt(x)$. The function $Qt(x)$ indicates the existence probability of the object at the time t. That is, $0 \le Qt(x) \le 1$ is satisfied.

The probability of the object $Xi$ existing at the cross point at the time t can be calculated by the following Expression 2 (where $xc$ indicates the position of the cross point). In the following Expression 2, $\delta$ indicates a delta function.

$$p(t) = \int_{x=-\infty}^{x=+\infty} Qt(x) \delta(x-xc) dx = Qt(xc) \qquad \text{[Expression 2]}$$

In Expression 2, when $p(t)$ is integrated over the time $[t_1, t_2]$ when the host vehicle passes through the cross point, the risk R of an object, such as another vehicle, at the position $xc$ can be calculated by the following Expression 3 (where $t_1$ is the time when the head of the host vehicle passes through the cross point and $t_2$ is the time when the tail of the host vehicle passes through the cross point).

$$R = \int_{t=t_1}^{t=t_2} p(t) dt \qquad \text{[Expression 3]}$$

The ECU 20 performs the same process as described above on the latent path $P_{LA}$ of a movable body which is likely to latently exist in the blind spot of the movable body to calculate the latent risk of the movable body. Since the risk at the cross point on the path is calculated by the above-mentioned process, it is possible to reduce the cost of calculating the risk and instantaneously perform the process, unlike a method of calculating the existence probability over the entire road.

Figure 9:
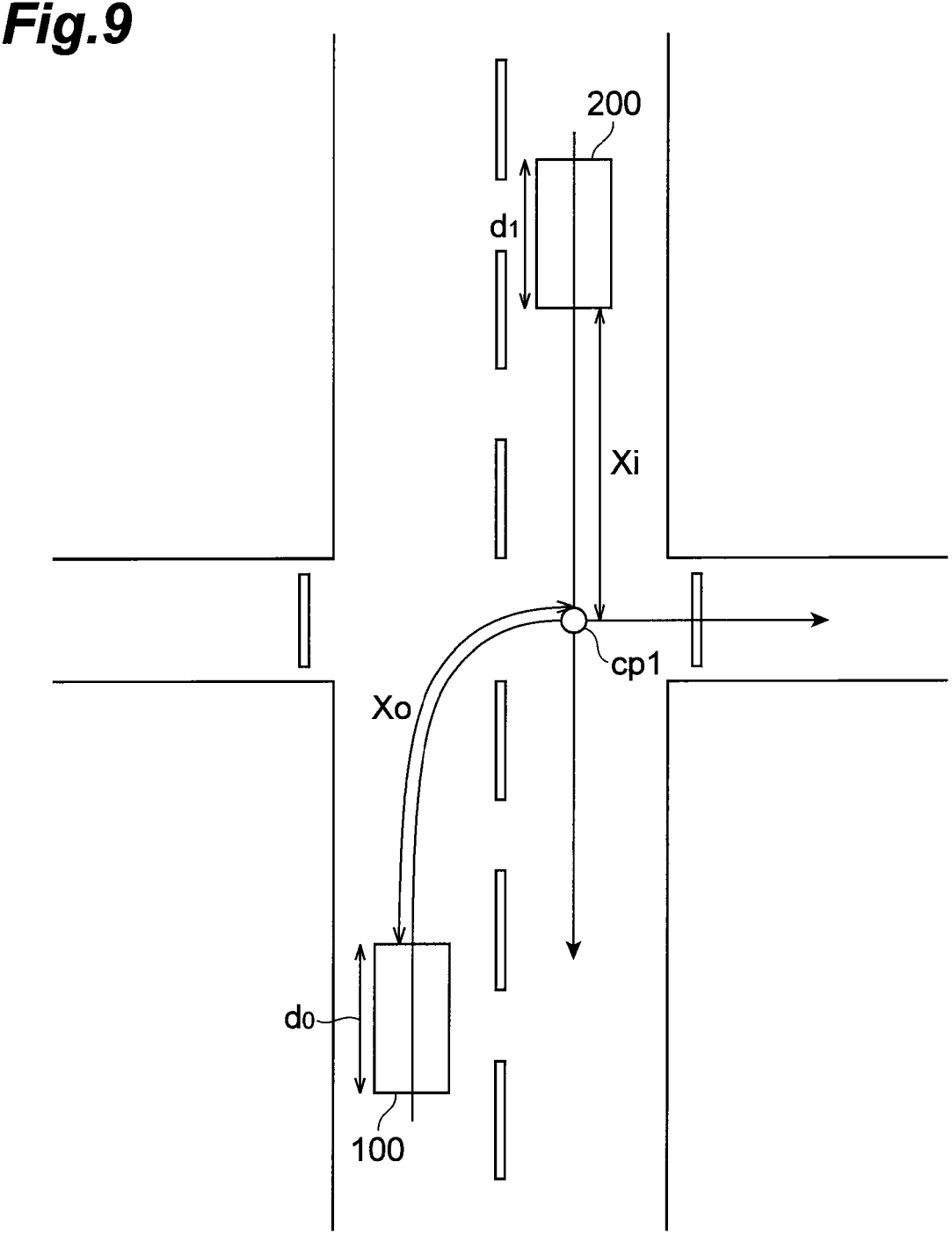
FIG. 9 is a plan view illustrating an assumed situation in risk prediction.

Next, the result obtained by calculating the actual risk under detailed road conditions using the above-mentioned method and driving the vehicle according to the action candidate model will be described. A method of calculating the risk of contact between the host vehicle 100 and another vehicle 200 under the road conditions shown in FIG. 9 will be described below. As shown in FIG. 9, the host vehicle 100 is disposed at a position that is $x_0$ [m] away from a cross point cp and travels at a speed of $v_0$ [m/s]. In addition, the total length of the host vehicle 100 is $d_0$ [m].

Another vehicle 200 is disposed at a position that is $x_1$ [m] away from the cross point cp and has an average speed $v_1$ [m/s] and a uniform speed distribution with a speed width $dv$ [$v_1-0.5\ dv$, $v_1+0.5\ dv$]. It is assumed that the integrated value of the speed distribution is 1. The total length of another vehicle 100 is $d_1$ [m]. The acceleration and deceleration of the host vehicle 100 are given by model parameters and are $a_{a0}$ and $a_{d0}$, respectively. The acceleration of another vehicle is $a_1$ and the error of the acceleration is not considered.

The risk is calculated by the following four processes:

(1) A process of generating the speed profiles of the host vehicle 100 and another vehicle 200;

(2) A process of calculating the time (transit time) from the start of the passage of the host vehicle 100 through the cross point cp to the end of the passage;

(3) A process of calculating the position distribution of another vehicle 200; and (4) A process of integrating the probability of another vehicle 200 being disposed at the cross point cp over the transit time to calculate a risk value.

Figure 10:
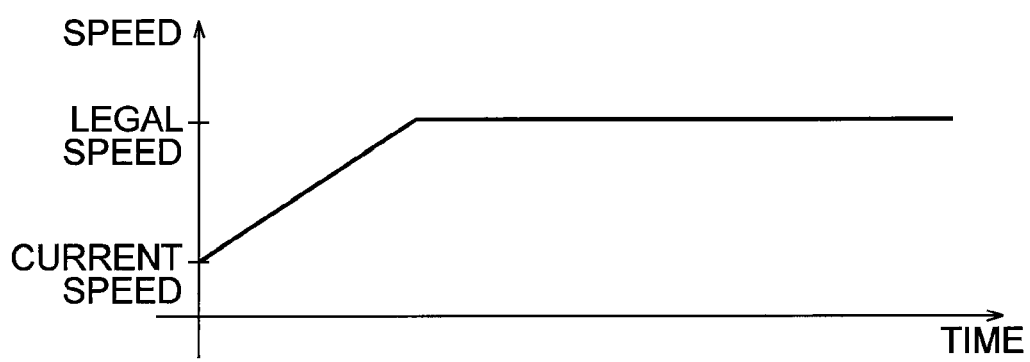
FIG. 10 is a graph illustrating the speed profiles of the host vehicle and another vehicle.
Figure 11:
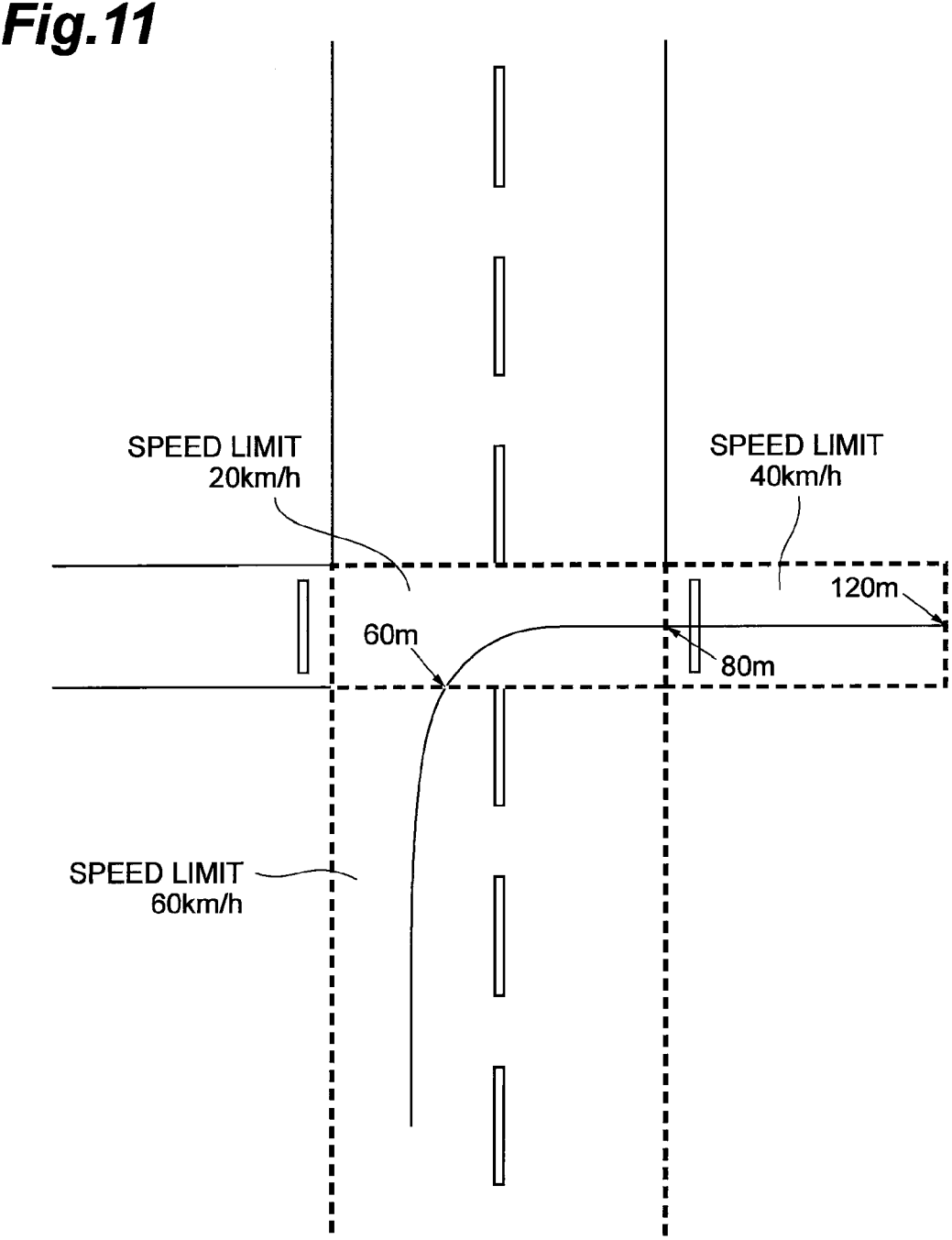
FIG. 11 is a plan view illustrating the speed limit of each portion at an assumed intersection.
Figure 12:
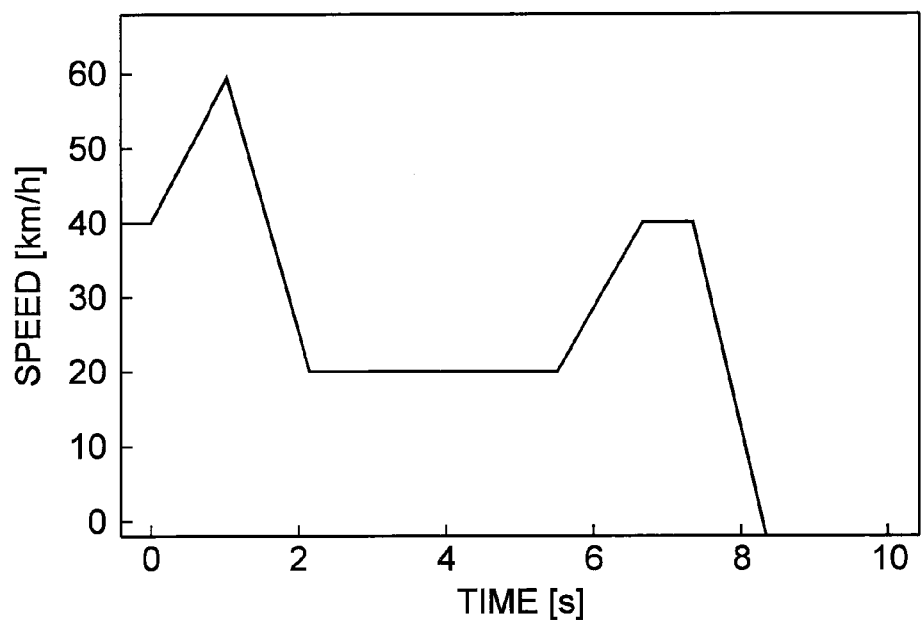
FIG. 12 is a graph illustrating the speed profile when the vehicle passes through the intersection.

First, the speed profiles of the host vehicle 100 and another vehicle 200 are generated. The speed profile indicates the operatively associated speed between the host vehicle 100 and another vehicle 200 as a function of time. FIG. 10 shows an example of the speed profile. The host vehicle 100 is accelerated or decelerated at a speed of $a_{a0}$ or $a_{d0}$ which is designated as the model parameter on the basis of action choices, calculates a speed change which enables the vehicle to be stopped at a stop position while observing the speed limit of the road, and uses the speed change as the speed profile. FIG. 12 shows an example of the generated speed profile in which the vehicle travels along the path shown in FIG. 11 on the road having the speed limit shown in FIG. 11.

As shown in FIG. 12, acceleration capable of increasing the speed of the vehicle from 0 km/h to 60 km/h in 5 seconds was used. Deceleration capable of decreasing the speed of the vehicle from 60 km/h to 0 km/h in 5 seconds was used. In addition, an initial speed at a position corresponding to 0 m on the path was 40 km/h. The acceleration of another vehicle 200 is $a_1$ and the speed profile of another vehicle 200 is generated, without considering the legal speed for the road.

The motion of the object can be fully calculated from the speed profile. The position $x(t)$ of the object at the time t may be calculated by integrating the speed profile from the time $t=0$ to the time t. That is, the position $x(t)$ is calculated by the following Expression 4 using a speed $v(T)$ at the time T.

$$x(t) = \int_{T=0}^{t} v(T) dT \qquad \text{[Expression 4]}$$

The speed at the time t is the value $v(t)$ of the speed profile at the time t. The time when the object reaches a position X may be calculated by solving an equation for t, such as the following Expression 5.

$$X = \int_{T=0}^{t} v(T) dT \qquad \text{[Expression 5]}$$

In the model according to this example, the speed is not allowed to have a negative value. Therefore, since the position increases monotonously with respect to time, the following Expression 5 definitely has one solution. Therefore, it is easy to solve the expression.

Figure 13:
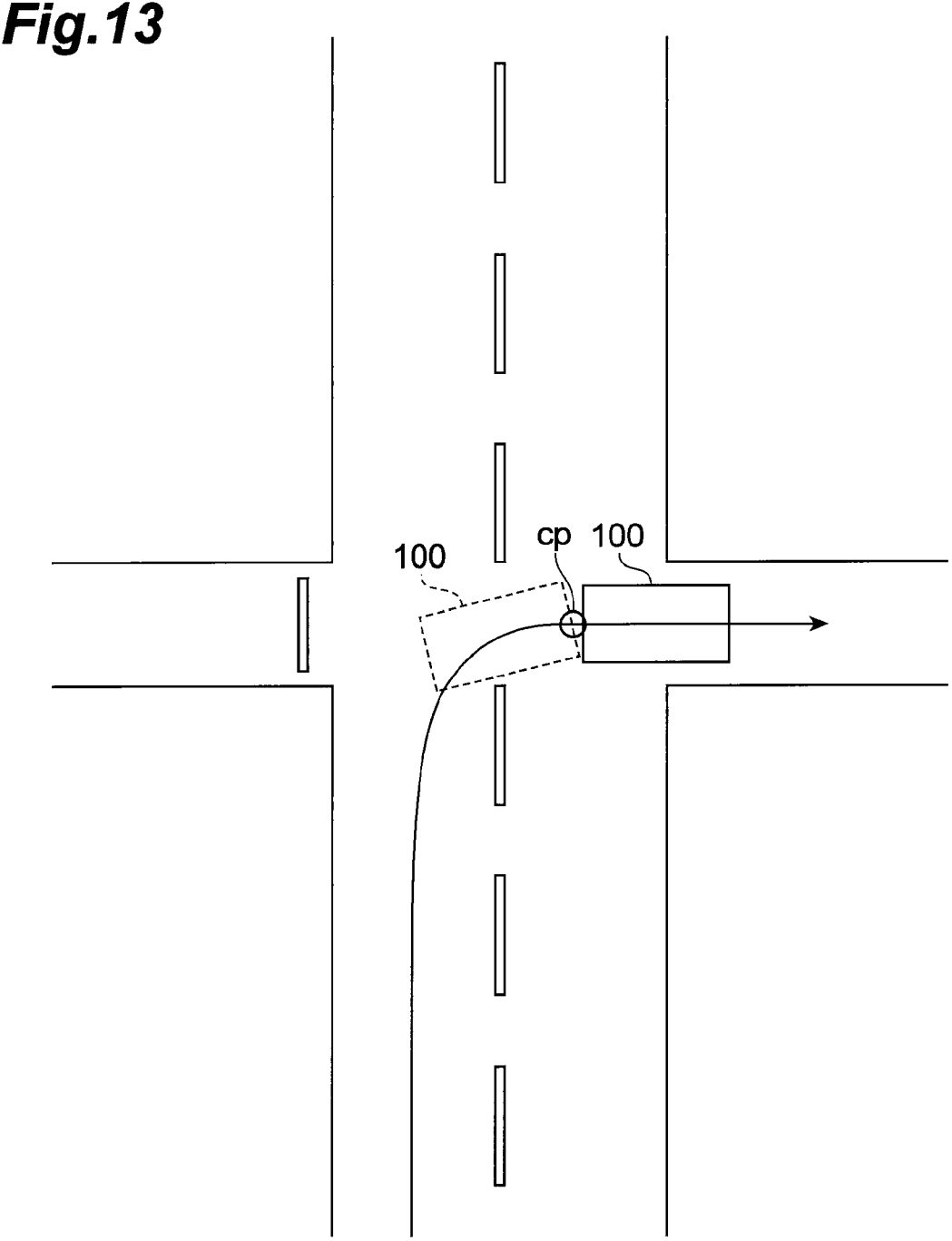
FIG. 13 is a plan view illustrating an aspect in which the head of the host vehicle passes through a cross point and then the tail of the host vehicle passes through the cross point.

Next, a method of calculating the transit time from the start of the passage of the host vehicle 100 through the cross point cp to the end of the passage will be described. The transit time is the time from the passage of the head of the host vehicle 100 through the cross point cp to the passage of the tail of the host vehicle 100 through the cross point cp. FIG. 13 shows an aspect in which the host vehicle 100 passes through the cross point cp. The time from the passage of the head of the host vehicle 100 through the cross point cp to the passage of the tail of the host vehicle 100 through the cross point cp can be calculated from the speed profile.

Figure 14:
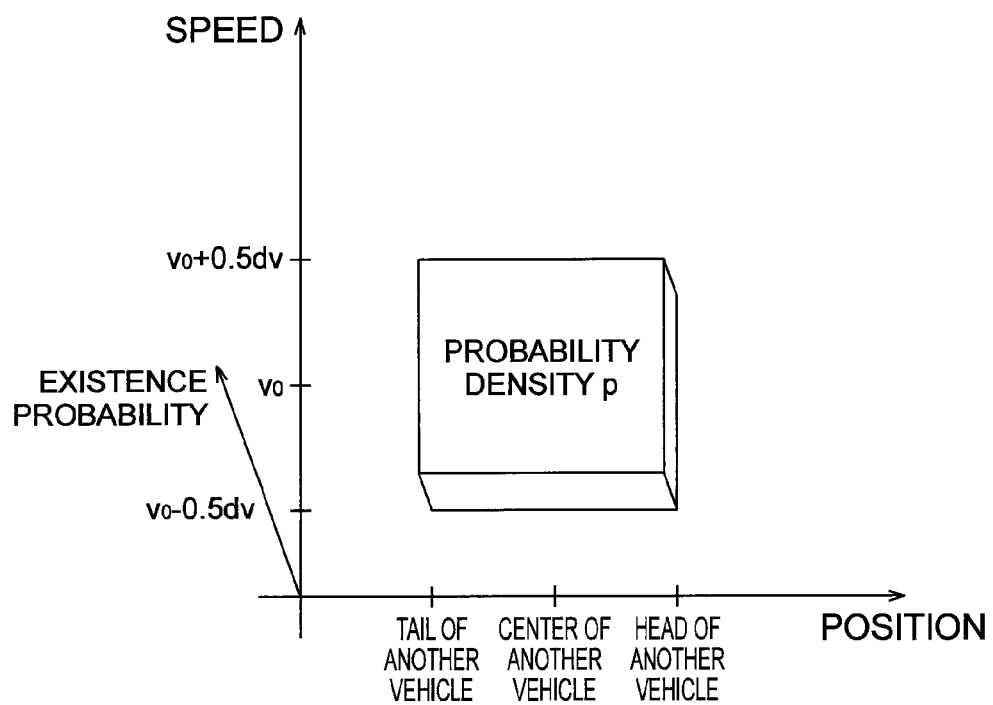
FIG. 14 is a graph illustrating the distribution of the probability of another vehicle existing at the current time.
Figure 15:
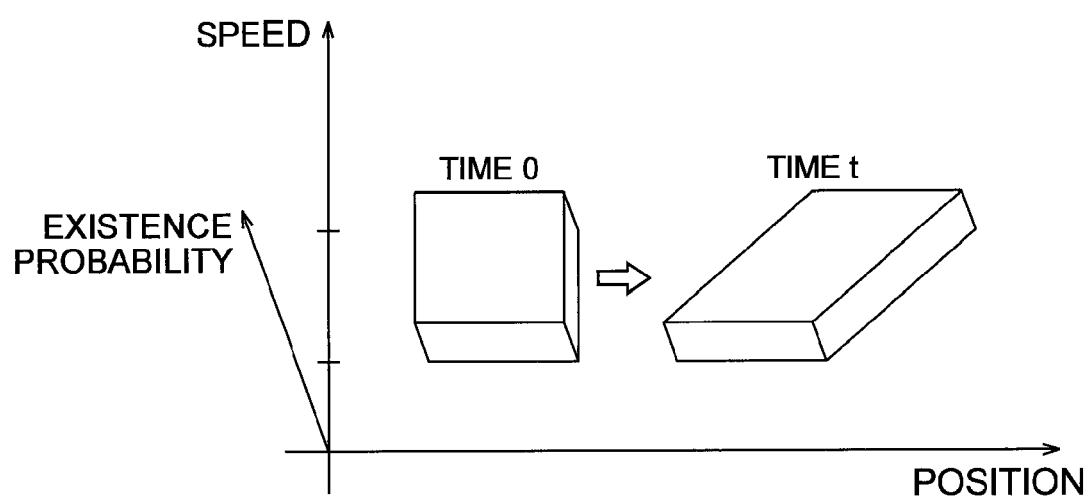
FIG. 15 is a graph illustrating the distribution of the probability of another vehicle existing at a time 0 and a time t.

Next, a method of calculating the position distribution of another vehicle 200 will be described. The position distribution of another vehicle 200 at a given time is calculated. At the time t=0 (referred to as the current time), another vehicle 200 is distributed in a position/speed space, as shown in FIG. 14. When the distribution shown in FIG. 14 is temporally evolved according to the speed profile (motion with constant acceleration) of another vehicle 200, a distribution shown in FIG. 15 is obtained. The reason is that, as the speed increases, the evolution is faster. As shown in FIG. 15, the distribution at the time t is changed to have a shape different from that of the distribution at the time t=0. However, since the distribution is a motion with constant acceleration (FIG. 15 shows an example in which the acceleration is 0) and there is no error in the acceleration, the distribution of another vehicle 200 definitely has a parallelogram shape at any given time.

When the distribution shown in FIG. 15 is integrated with respect to the speed, the position distribution of another vehicle 200 at the time t is obtained. That is, when the distribution of another vehicle 200 in the position/speed space at the time t is Pt(x, v), the position distribution Qt(x) of another vehicle at the time t is represented by the following Expression 6 which integrates the distribution at the time t which is shown in FIG. 16 with respect to the speed.

$$Qt(x) = \int_{v0-0.5dv}^{v0+0.5dv} Pt(x,v)dv \qquad \text{[Expression 6]}$$

Figure 16:
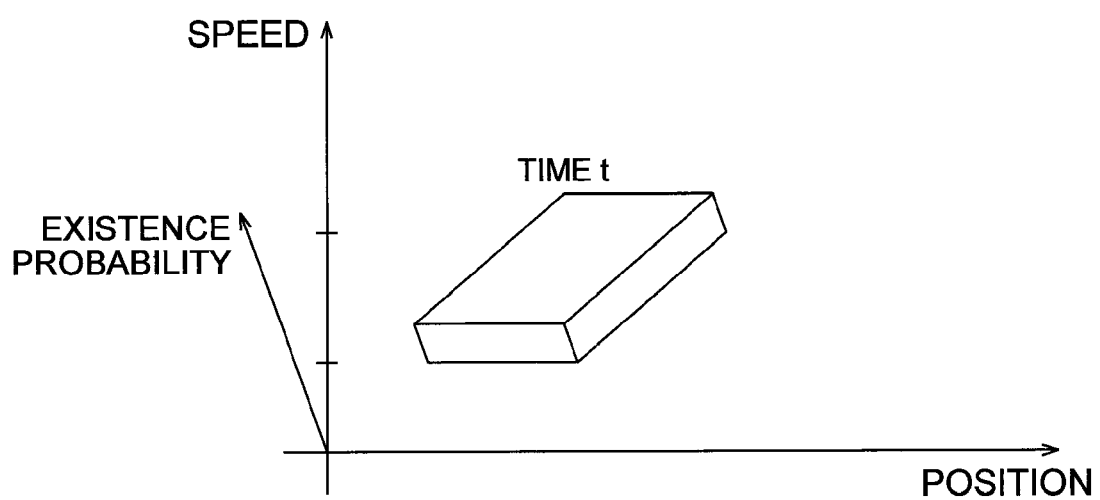
FIG. 16 is a graph illustrating the distribution of the probability of another vehicle existing at the time t.
Figure 17:
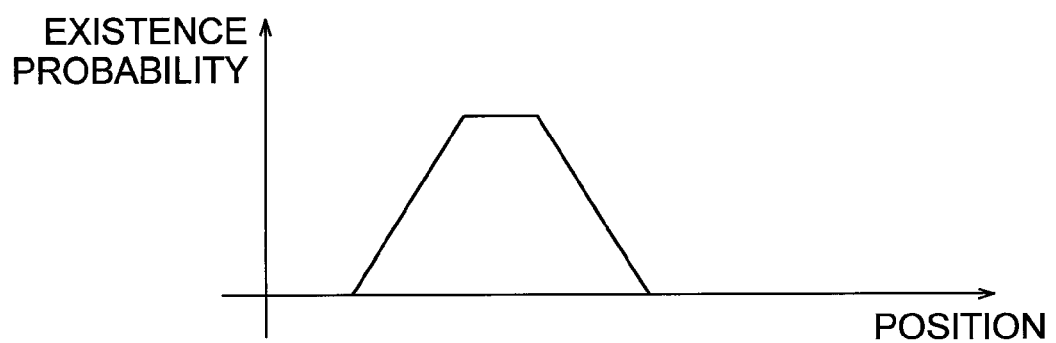
FIG. 17 is a graph illustrating the distribution of the probability of another vehicle existing at the position which is obtained by integrating the graph shown in FIG. 16 with respect to the speed.

Since the distribution has a parallelogram shape in the speed/position space shown in FIG. 16, the position distribution certainly has a trapezoidal shape, as shown in FIG. 17. The distribution can be simply integrated from the geometric properties of the distribution in the position/speed space.

Figure 18:
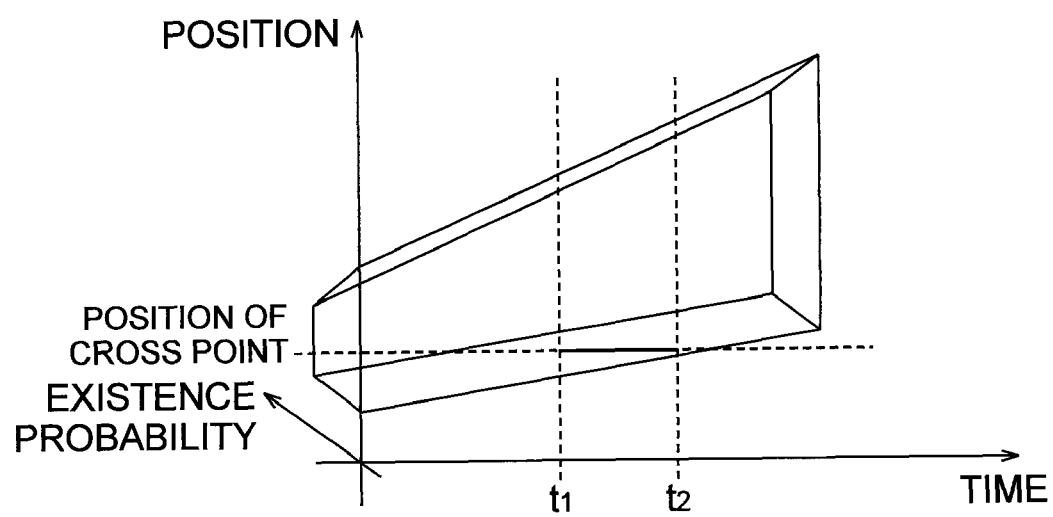
FIG. 18 is a graph illustrating the distribution of the probability of another vehicle existing at the position over the transit time.

Next, a method of integrating the probability of another vehicle 200 existing at the cross point cp over the transit time to calculate a risk value will be described. This corresponds to the integration of the probability of another vehicle 200 existing at the cross point cp for the time when the host vehicle 100 passes through the cross point cp. It is assumed that the time when the host vehicle 100 passes through the cross point cp is $[t_1, t_2]$. The head of the host vehicle 100 passes through the cross point cp at the time $t_1$ and the tail of the host vehicle 100 passes through the cross point cp at the time $t_2$. FIG. 18 is a conceptual diagram illustrating the integration of the position distribution of another vehicle 200 over the transit time. In FIG. 18, the existence probability is integrated at the transit time $[t_1, t_2]$ represented by a thick line. This integration is performed by a numerical integration method.

Figure 19:
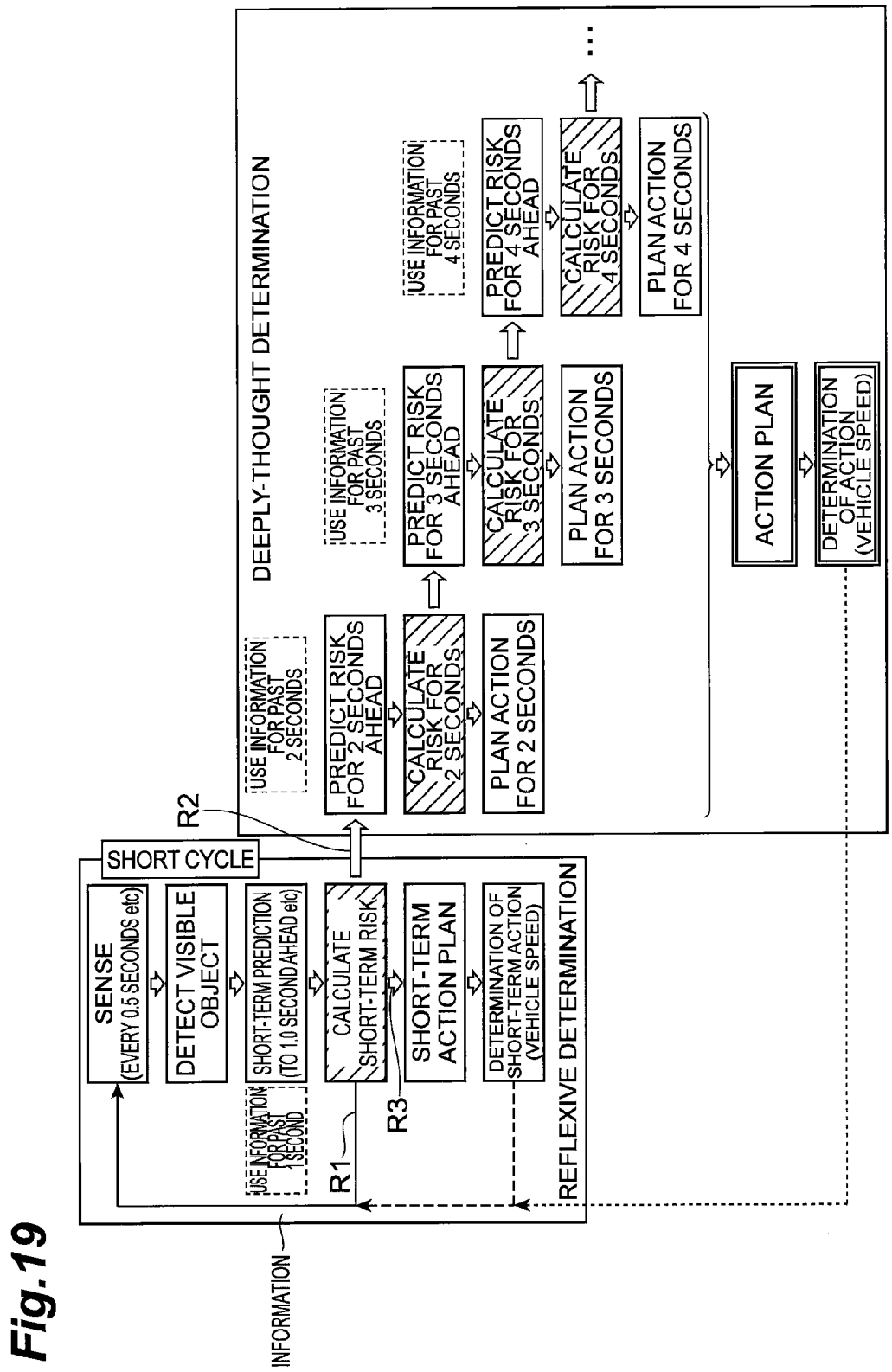
FIG. 19 is a diagram illustrating a risk prediction process using a combination of reflexive determination and long-term determination and a normative action determination process.

Next, the risk prediction (S4) and the determination of the normative action (S5) according to this embodiment will be described in detail. As a basic point of view, in this embodiment, the driving action pattern of persons is considered, the choices of the driving action pattern are prepared, and a normative action which is within an allowable risk range and has high movement efficiency is selected. As shown in FIG. 19, in this embodiment, a risk is predicted for the avoidance of a short-time reflexive risk (reflexive determination) and the avoidance of a long-time deeply-thought risk (deeply though determination). In the example shown in FIG. 19, the risk is predicted assuming that the solution satisfying a decision criterion for the normative action is, for example, the past or future within four seconds. That is, in this embodiment, the prediction time is multi-scaled.

As shown in FIG. 19, in the reflexive determination, information for the past one second is used. As shown in FIG. 19, for example, obstacles around the host vehicle 100 are recognized at an interval of 0.5 seconds to detect a visible target. For example, short-term prediction which is limited to the future after one second is performed to calculate the short-term risk. When the short-term risk is more than a threshold value, the process proceeds to a routine R3 and a short-term action plan is set and the short-term risk of a short-term action, such as a vehicle speed, is calculated again.

On the other hand, when the short-term risk is less than the threshold value, the process proceeds to a routine R1 and the short-term risk is calculated again at an interval of 0.5 seconds. In this case, a routine R2 is also executed to perform the deeply-thought determination. As shown in FIG. 19, the calculation of a 2 to 4-second risk, which is the calculation of the risk for 2 to 4 seconds ahead, and the setting of a 2 to 4-second action plan, which is the planning of an action for 2 to 4 seconds, are performed. In the 2 to 4-second action plan, an action plan with the maximum movement efficiency and the minimum risk is selected and performed. For example, an action plan in which the vehicle is temporarily stopped in front of the center of the intersection and then turns right or the vehicle turns right without being temporarily stopped is selected. When the routine R3 is performed, the short-term risk is high. Therefore, the routine R1 and the routine R2 are not performed. In the selected action plan, similarly to the short-term action plan, the short-term risk of the short-term action, such as a vehicle speed, is calculated again. These action plans are updated at an interval of 0.5 seconds and the latest plans are constantly used.

As described above, in this embodiment, the calculation of the short-term risk for one second and the calculation of the risk for 2 to 4 second are performed in parallel for a plurality of normative actions. In the 2 to 4-second action plan, since the action plan with the maximum movement efficiency and the minimum risk is selected, the optimal action plan is determined. The relationship between the past period of time (second) for obtaining information and the future period of time (second) for calculating the risk may be determined by the driving tendency of the driver and the normative action suitable for the individual driver may be determined.

In this embodiment, as a basic point of view, a plurality of normative action choices of the host vehicle 100 is prepared for each objective of the action of the host vehicle 100 and a normative action with the maximum movement efficiency and the minimum risk is selected. As a result, a normative action, such as a normative vehicle speed, is determined.

Figure 20:
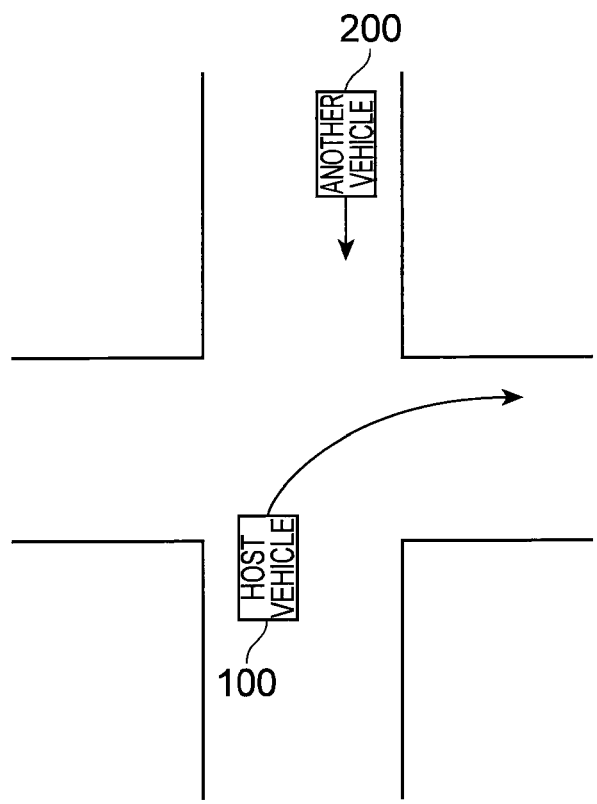
FIG. 20 is a plan view illustrating a situation assumed in the risk prediction of a normative action and the determination of the normative action.
Figure 21:
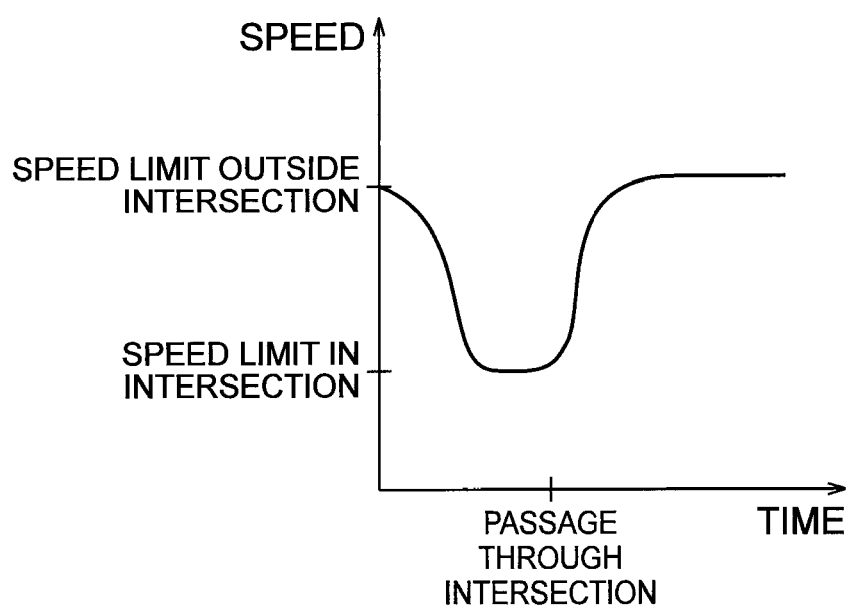
FIG. 21 is a graph illustrating the speed profile of normative action candidates in the situation shown in FIG. 20.
Figure 22:
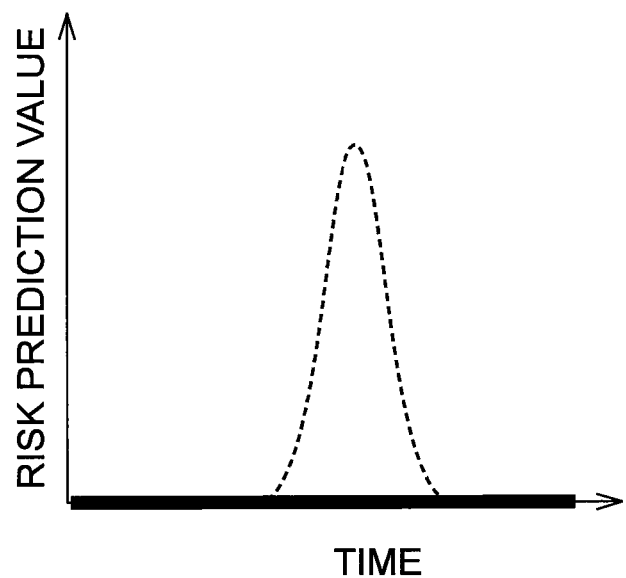
FIG. 22 is a graph illustrating the risk prediction values of the normative action candidate shown in FIG. 21 with respect to time.
Figure 23:
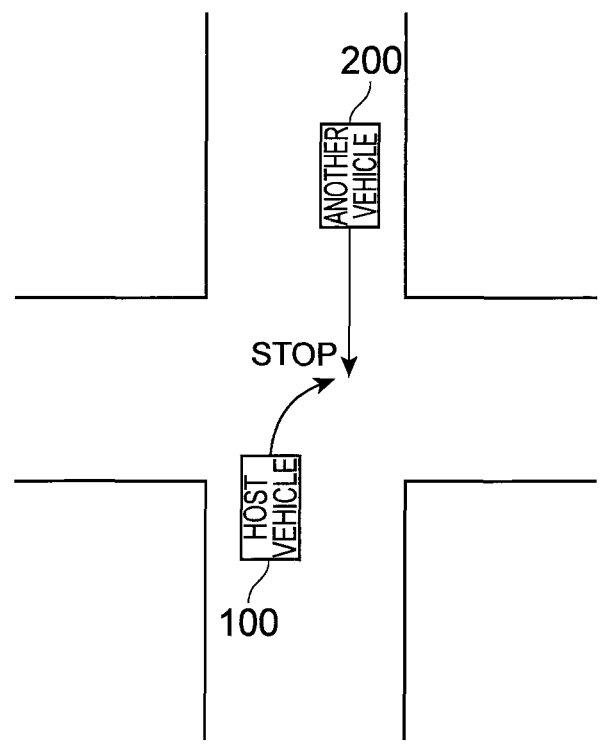
FIG. 23 is a plan view illustrating a case in which the host vehicle is stopped in the situation shown in FIG. 20.
Figure 24:
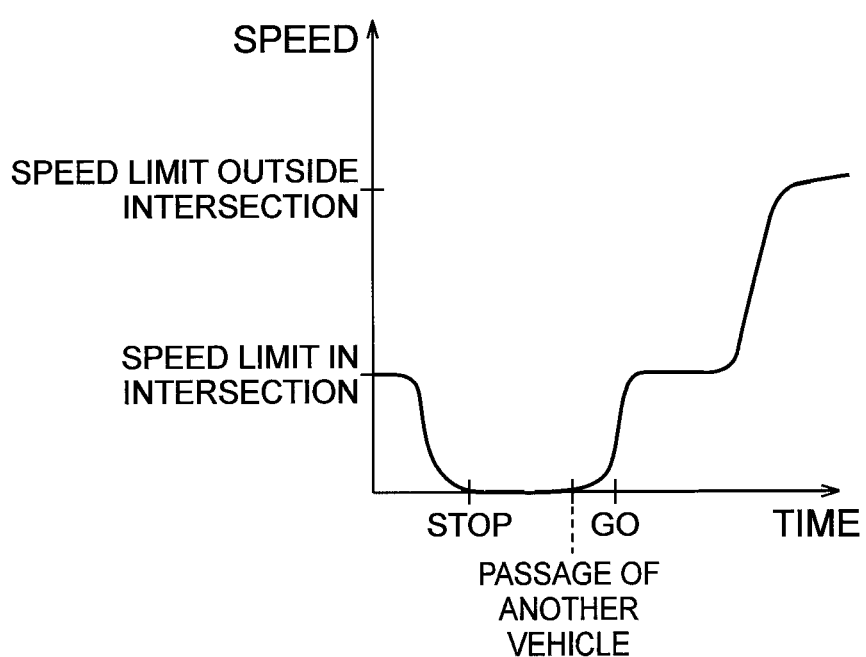
FIG. 24 is a graph illustrating the speed profiles of the normative action candidate in the situation shown in FIG. 23.
Figure 25:
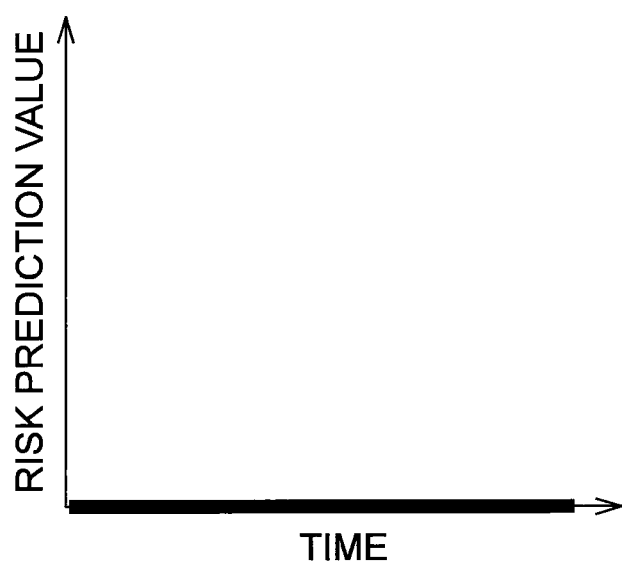
FIG. 25 is a graph illustrating the risk prediction values of the normative action candidate shown in FIG. 24 with respect to time.

As shown in FIG. 20, it is assumed that the host vehicle 100 turns right with respect to another vehicle 200, which is an oncoming vehicle. As shown in FIG. 21, in normative action 1, which is an action choice, since the vehicle is not temporarily stopped, a large risk prediction value is obtained, as shown in FIG. 22, and the movement efficiency is high. On the other hand, as in normative action 2 shown in FIGS. 23 and 24, when the host vehicle 100 is temporarily stopped while turning right, a small risk prediction value is obtained, as shown in FIG. 25, and the movement efficiency is low.

The intersection right turn action choices are mainly classified into the following four actions:

(1) An action of being temporarily stopped before the intersection (by the regulation of, for example, a signal or a temporary stop line);

(2) An action of being stopped in the vicinity of the center of the intersection (by the existence of an oncoming vehicle); and (3) An action of being stopped in front of a right turn road (by the existence of the pedestrian during a right turn); and (4) An action of turning right without being stopped.

Figure 26:
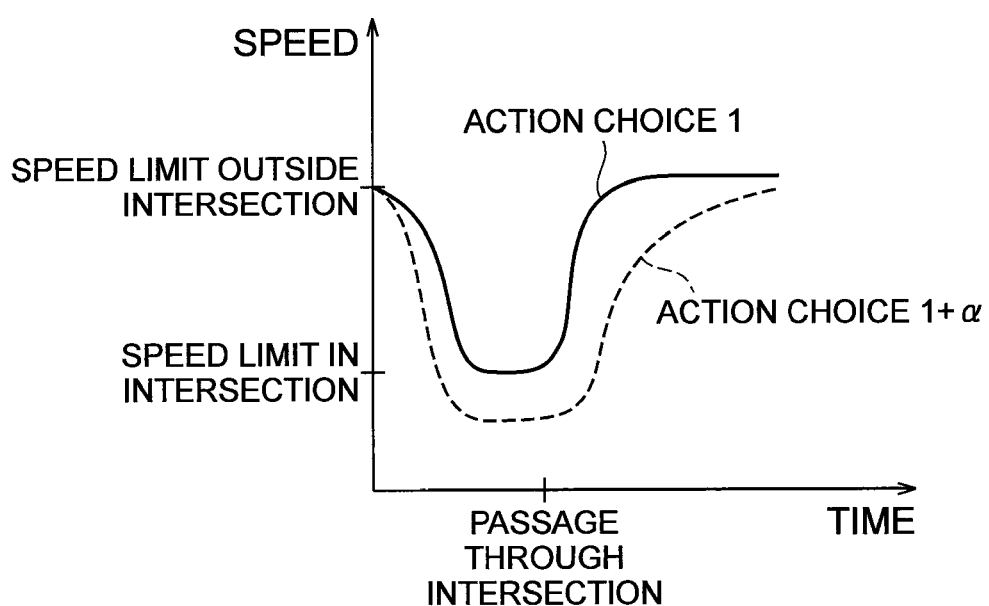
FIG. 26 is a graph illustrating the speed profile of each normative action candidate.

In the situations of the intersection right turn action, normative action 1 belongs to the classification (4), and normative action 2 belongs to the classification (2). Among the classifications (1) to (4), there are a plurality of variants of the action choices. For example, as shown in FIG. 26, there is an action choice 1+α different from normative action 1, which is an action choice. As such, in this embodiment, among the classified assumed action choices, an action with a low risk and the maximum movement efficiency is selectively determined from the classified action choices. For example, in FIG. 26, if the predicted risks of action choice 1 and action choice 1+α are equal to each other, action choice 1 is selected since it has higher movement efficiency.

Figure 27:
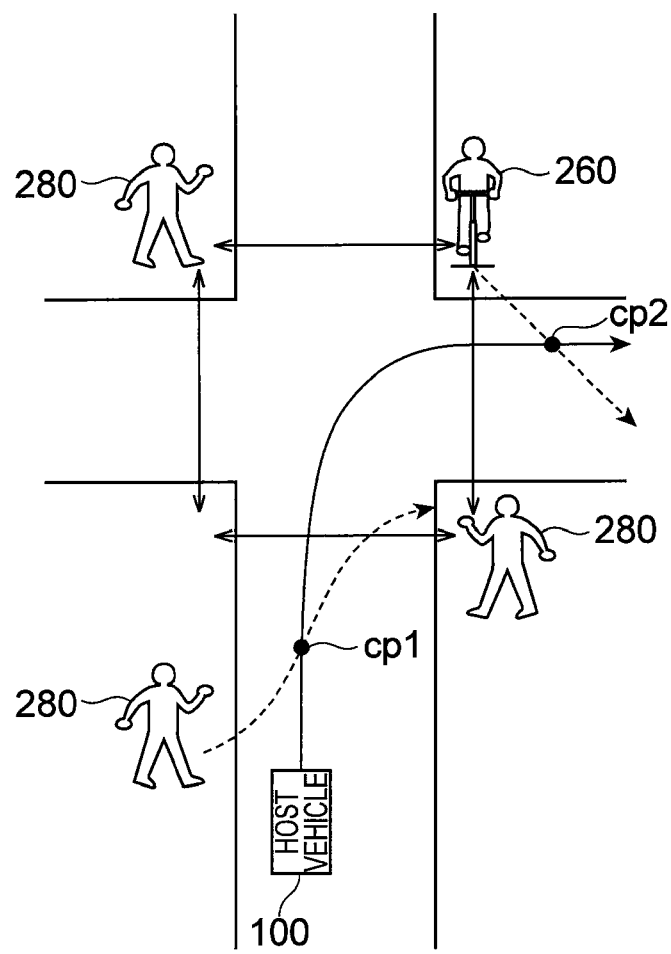
FIG. 27 is a plan view illustrating a situation in which risk prediction is performed on, for example, a pedestrian and a bicycle.

The other vehicle 200 is less likely to deviate from the assumed path except for exceptional cases. However, as shown in FIG. 27, the other vehicle 200 is likely to move along a path which largely deviates from the assumed path represented by a solid line in FIG. 27 for a bicycle 260 or a pedestrian 280, as represented by a dashed line in FIG. 27. The action represented by a dashed line is predicted using the past information at intervals of a predetermined unit time. Specifically, prediction is performed by a first-order approximation model of a simple motion or a state space model in time-series analysis and risk prediction is performed at the cross points cp1 and cp2 which are not assumed.

Figure 28:
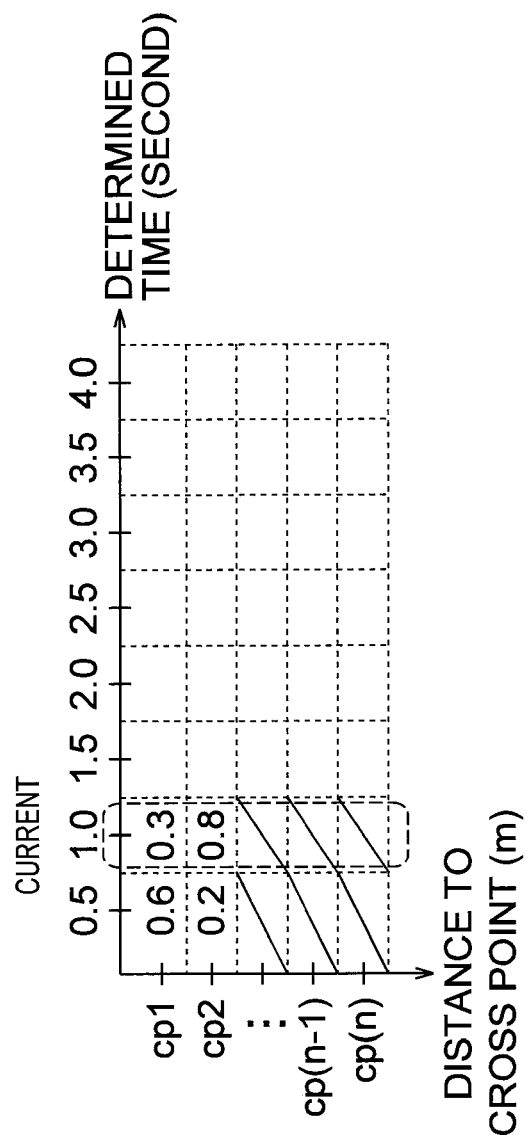
FIG. 28 is a table illustrating the risk value obtained at each cross point arrival time at each determination time.

In risk prediction for the possibility of the host vehicle 100 and the other vehicle 200 contacting each other, as shown in FIG. 28, risk values are predicted at the arrival times at various cross points cp1 to cp(n). In FIG. 28, a portion represented by a dashed line is a CP (cross point) vector at that time.

Figure 29:
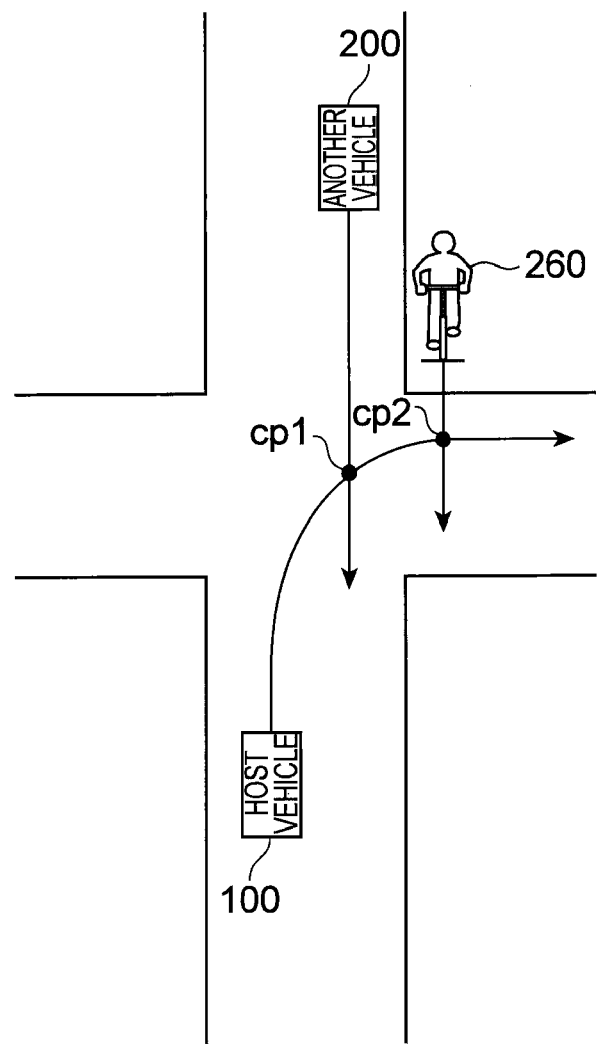
FIG. 29 is a plan view illustrating cross points between the host vehicle, and another vehicle and a bicycle.
Figure 30:
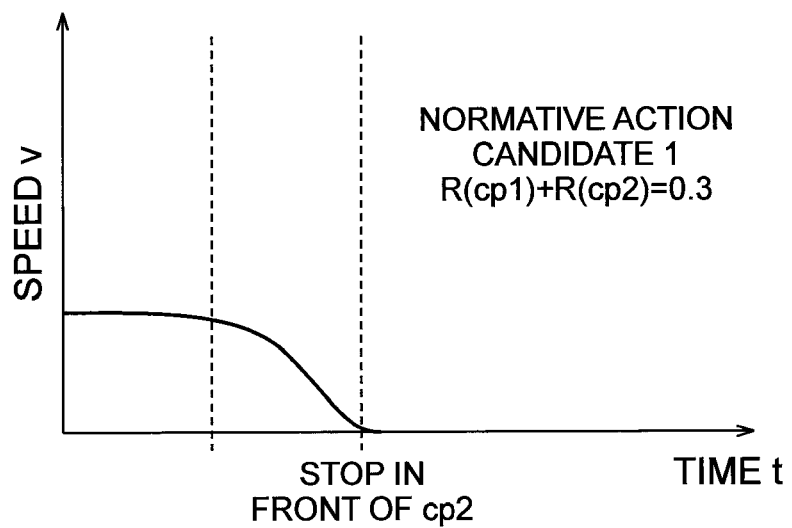
FIG. 30 is a graph illustrating the speed profile of normative action candidate 1.
Figure 31:
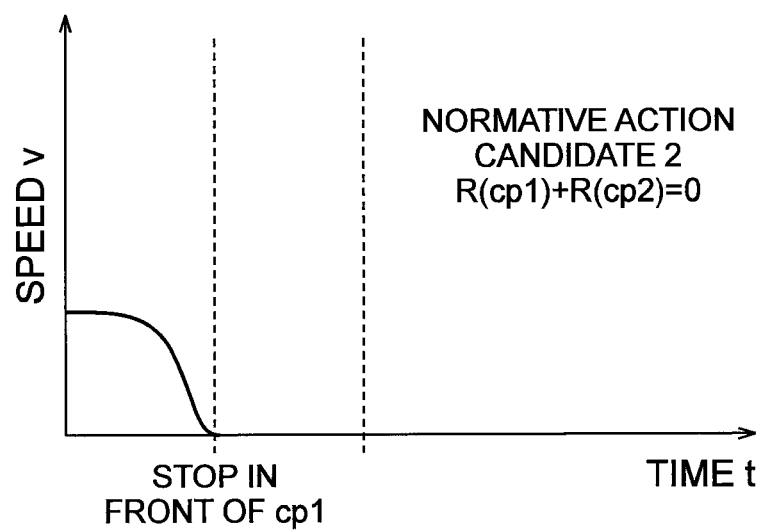
FIG. 31 is a graph illustrating the speed profile of normative action candidate 2.
Figure 32:
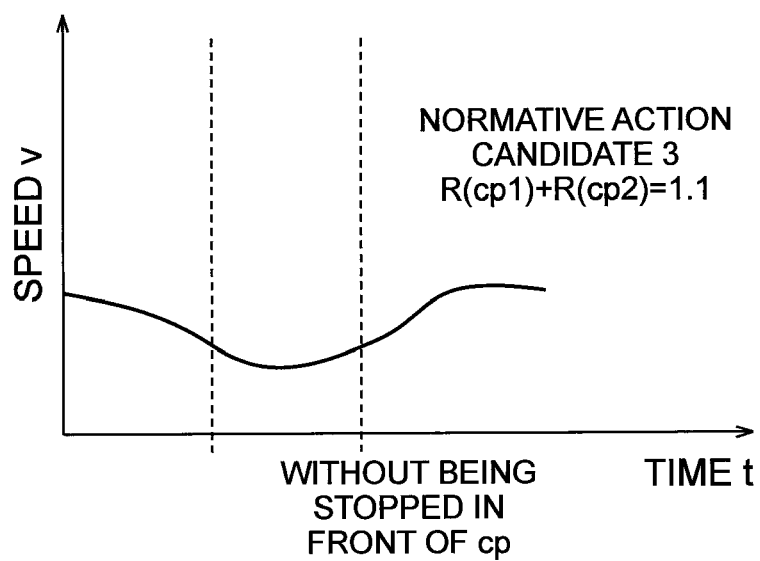
FIG. 32 is a graph illustrating the speed profile of normative action candidate 3.

The sum of the risk values at each cross point (for example, cp1) shown in FIG. 29 is calculated from the CP vector at the current time and a normative action candidate with the minimum risk is selected. For example, among normative action candidates 1 to 3 shown in FIGS. 30 to 32, normative action candidate 2 with a risk value R of 0 is selected.

When there is a normative action candidate which is equal to or less than a predetermined risk permissible value limit, normative driving is determined by the efficiency of movement to a target point. For example, when the risk permissible value limit is set to be equal to or less than 0.4, normative action candidate 1 having a risk value R of 0.3 which is less than 0.4 and movement efficiency more than that of normative action candidate 2 is selected in FIGS. 30 to 32.

In the above-mentioned example, the position and speed of another vehicle 200 are predicted from data, such as the past vehicle speed before one stage (for example, before 0.5 seconds). However, the past data before a few seconds may be used. For example, the number of past data items for a few seconds is as follows:

(1) The position and speed of the vehicle are predicted using data for the past four seconds (the number of data items is 8);

(2) The position and speed of the vehicle are predicted using data for the past three seconds (the number of data items is 6);

(3) The position and speed of the vehicle are predicted using data for the past two seconds (the number of data items is 4);

(4) The position and speed of the vehicle are predicted using data for the past one second (the number of data items is 2);

(5) The position and speed of the vehicle are predicted using data for the past 0.5 seconds (the number of data items is 1).

When the past data is observed, the stability of prediction is used as an evaluation standard for the prediction accuracy of the actions of another vehicle 200 and the host vehicle 100. For example, when the prediction result is greatly changed depending on the observation time, the prediction result for the past long time has low prediction stability and thus has low reliability. Therefore, prediction is performed using the observation result for a short time, such as the past one second. On the other hand, when the prediction result is not greatly changed depending on the observation time, the stability of prediction is high. Therefore, the observation result for longer one second previous is used to perform prediction which is less affected by disturbance.

According to this embodiment, the ECU 20 of the driving support device 10 predicts the risk of contact between the host vehicle 100 and obstacles around the host vehicle 100 when the host vehicle 100 travels by a driving action related to at least one normative action candidate, which is the normative driving action of the host vehicle 100 for the surrounding conditions of the host vehicle. Therefore, it is possible to provide the normative action candidates considering the risk of contact between the host vehicle 100 and obstacles around the host vehicle 100.

According to this embodiment, the ECU 20 of the driving support device 10 predicts the risk of contact between the host vehicle 100 and obstacles around the host vehicle 100 when the host vehicle 100 travels by a driving action related to at least one normative action candidate, which is the normative driving action of the host vehicle 100 for the surrounding conditions of the host vehicle 100, and acquires movement efficiency when the host vehicle 100 travels by the driving action related to the normative action candidates. Therefore, it is possible to provide the normative action candidates considering the risk of contact between the host vehicle 100 and obstacles around the host vehicle 100 and the movement efficiency.

The ECU 20 recognizes obstacles using a multi-scale recognition method, on the basis of information acquired from the obstacles around the host vehicle 100, and information acquired from the database in which information which is macroscopically associated with the obstacle information or information which is microscopically associated with the obstacle information is hierarchically stored, and predicts the risk of contact between the obstacles and the host vehicle 100. Therefore, even when the obstacle information acquired from the obstacles is limited, it is possible to acquire macroscopic or microscopic information from the range of the obtained information and thus accurately recognize obstacles.

The ECU 20 predicts the risk of contact between the host vehicle 100 and the obstacles while predicting the default path $P_{DE}$, which is the most general route, and the adaptive path $P_{AD}$ different from the general path for the route in which the predicted destinations of the host vehicle 100 and the obstacle are the same. Therefore, it is possible to improve the prediction accuracy of the risk considering a plurality of routes.

The ECU 20 predicts the risk of contact between the host vehicle 100 and an obstacle while predicting the overt path $P_{OV}$, which is a directly recognizable path of the obstacle, and the latent path $P_{LA}$, which is a route of the obstacle that cannot be directly recognized, but is expected to exist, for the predicted path of the obstacle. Therefore, it is possible to predict the risk of a latent obstacle and improve the reliability of the predicted risk.

The ECU 20 predicts the risk of contact between the host vehicle 100 and an obstacle on the basis of the distribution of the probability of the host vehicle 100 and the obstacle existing on the predicted route of the host vehicle 100 and the obstacle. Therefore, it is possible to predict the risk of contact between the host vehicle 100 and the obstacle with a small amount of calculation, as compared to, for example, a method of calculating the probability of the host vehicle 100 and the obstacle existing on the entire road.

In particular, the ECU 20 predicts the risk of contact between the host vehicle 100 and an obstacle on the basis of the distribution of the probability of the host vehicle 100 and the obstacle existing in a space having the position and speed of the host vehicle 100 and the obstacle on the predicted route as coordinate axes. Therefore, it is possible to predict the risk of contact between the host vehicle 100 and the obstacle with a small amount of calculation.

The ECU 20 predicts a short-term risk, which is the risk of contact between an obstacle and the host vehicle 100 after a predetermined time has elapsed from the current time, and a long-term risk for 2 to 4 seconds, which is the risk of contact between an obstacle and the host vehicle 100 after the time longer than the predetermined time has elapsed, when the host vehicle 100 travels by the driving action related to the normative action candidate. Therefore, it is possible to predict the risk of contact between the obstacle and the host vehicle 100 in various ways from a short-term point of view and a long-term point of view for the normative action candidates.

In addition, when the value of the short-term risk is more than a predetermined threshold value and the risk of the driving action related to the normative action candidate is very high in the short time, the ECU 20 stops the prediction of the long-term risk since the validity of the normative action candidate is low and the necessity for predicting the long-term risk later is low. Therefore, it is possible to reduce the amount of unnecessary calculation.

The embodiment of the invention has been described above, but the invention is not limited to the above-described embodiment. Various modifications and changes of the invention can be made.

INDUSTRIAL APPLICABILITY

According to the driving support device of the invention, it is possible to provide normative action candidates considering the risk of contact between the host vehicle and obstacles around the host vehicle.

REFERENCE SIGNS LIST

10: DRIVING SUPPORT DEVICE
11: VEHICLE SPEED SENSOR
12: RADAR SENSOR
13: CAMERA SENSOR
14: NAVIGATION SYSTEM
15: DIRECTION INDICATOR SENSOR
16: STEERING ANGLE SENSOR
17: ROAD-TO-VEHICLE COMMUNICATION DEVICE
18: DRIVER AUTHENTICATION UNIT
20: ECU
31: ACTUATORS
32: DISPLAY DEVICE
100: HOST VEHICLE
200: ANOTHER VEHICLE
250: LATENT OBJECT
260: BICYCLE
280: PEDESTRIAN

The invention claimed is:

1. A driving support device comprising:
a risk prediction unit that predicts a risk of contact between a host vehicle and obstacles around the host vehicle when the host vehicle travels by a driving action related to at least one normative action candidate, which is a normative driving action candidate of the host vehicle for surrounding conditions of the host vehicle,
wherein the risk prediction unit calculates an existence probability of the obstacle as a one dimensional integral calculation at a cross point between a predicted path of the host vehicle and a predicted path of the obstacle in a space having the position and speed of the host vehicle and the obstacle on the predicted path as coordinate axes, and
wherein the risk prediction unit predicts the risk of contact between the host vehicle and the obstacle by integrating the existence probability of the obstacle over a time between a time when the head of the host vehicle passes through the cross point and a time when the tail of the host vehicle passes through the cross point.

2. A driving support device comprising:
a risk prediction unit that predicts a risk of contact between a host vehicle and obstacles around the host vehicle when the host vehicle travels by a driving action related to at least one normative action candidate, which is a normative driving action candidate of the host vehicle for surrounding conditions of the host vehicle; and
a movement efficiency acquiring unit that acquires movement efficiency when the host vehicle travels by the driving action related to the normative action candidate,
wherein the risk prediction unit calculates an existence probability of the obstacle as a one dimensional integral calculation at a cross point between a predicted path of the host vehicle and a predicted path of the obstacle in a space having the position and speed of the host vehicle and the obstacle on the predicted path as coordinate axes, and
wherein the risk prediction unit predicts the risk of contact between the host vehicle and the obstacle by integrating the existence probability of the obstacle over a time between a time when the head of the host vehicle passes through the cross point and a time when the tail of the host vehicle passes through the cross point.

3. The driving support device according to claim 1, wherein the risk prediction unit recognizes an obstacle on the basis of obstacle information acquired from the obstacles around the host vehicle and information acquired from a database in which any one of information which is more macroscopically associated with the obstacle information and information which is more microscopically associated with the obstacle information is hierarchically stored, and predicts the risk of contact between the obstacle and the host vehicle.

4. The driving support device according to claim 1, wherein the risk prediction unit predicts the risk of contact between the obstacle and the host vehicle while predicting a normal path, which is the most general path, and an irregular path different from the normal path for paths of the host vehicle or the obstacle in which the predicted destinations are the same.

5. The driving support device according to claim 1,
wherein the risk prediction unit predicts the risk of contact between the obstacle and the host vehicle while predicting an overt path, which is a directly recognizable path of the obstacle, and a latent path, which is a path of the obstacle that cannot be directly recognized, but is expected to exist, for the predicted path of the obstacle.

6. The driving support device according to claim 1,
wherein the risk prediction unit predicts a short-term risk, which is the risk of contact between the obstacle and the host vehicle after a predetermined time has elapsed from the current time, and a long-term risk, which is the risk of contact between the obstacle and the host vehicle after a time longer than the predetermined time has elapsed, when the host vehicle travels by the driving action related to the normative action candidate.

7. The driving support device according to claim 6,
wherein, if the short-term risk is more than a predetermined threshold value, the risk prediction unit stops the prediction of the long-term risk when the host vehicle travels by the driving action related to the normative action candidate.

* * * * *

UNITED STATES PATENT AND TRADEMARK OFFICE
CERTIFICATE OF CORRECTION

PATENT NO.       : 8,947,218 B2
APPLICATION NO.  : 13/504373
DATED            : February 3, 2015
INVENTOR(S)      : Shintaro Yoshizawa et al.

It is certified that error appears in the above-identified patent and that said Letters Patent is hereby corrected as shown below:

In the specification

At column 1, line 2, after the title, insert:
--This is a 371 national phase application of PCT/JP2010/054990 filed 23 March 2010, which claims priority to Japanese Patent Application No. 2009-250976 filed 30 October 2009, the contents of which are incorporated herein by reference.--.

At column 9, line 25, Expression 1, change " $xi = \int_0^t \|dCi/dt\| dt$ „ to -- $xi = \int_0^t \|dCi/dt\| dt$ --.

At column 9, line 47, Expression 2, change " $p(t) = \int_{x=-\infty} Qt(x)\delta(x-xc)dx = Qt(xc)$ „ to -- $p(t) = \int_{x=-\infty}^{x=+\infty} Qt(x)\delta(x-xc)dx = Qt(xc)$ --.

At column 9, line 55, Expression 3, change " $R = \int_{t=t1} p(t)dt$ „ to -- $R = \int_{t=t1}^{t=t2} p(t)dt$ --.

Signed and Sealed this
Eighth Day of December, 2015

Michelle K. Lee
*Director of the United States Patent and Trademark Office*

CERTIFICATE OF CORRECTION (continued)
U.S. Pat. No. 8,947,218 B2

In the specification

At column 10, line 55, Expression 4, change " $x(t) = \int_{T=0} v(T)dt$ ,"
to -- $x(t) = \int_{T=0}^{t} v(T)dt$ --.

At column 10, line 62, Expression 5, change " $X = \int_{T=0} v(T)dt$ ,"
to -- $X = \int_{T=0}^{t} v(T)dt$ --.

At column 11, line 37, Expression 6, change " $Qt(x) = \int_{v0-0.5dv} Pt(s,v)dv$ "
to -- $Qt(x) = \int_{v0-0.5dv}^{v0+0.5dv} Pt(s,v)dv$ --.